(12) United States Patent
Shen et al.

(10) Patent No.: US 10,481,301 B2
(45) Date of Patent: Nov. 19, 2019

(54) NANOMETRIC TIN-CONTAINING METAL OXIDE PARTICLE AND DISPERSION, AND PREPARATION METHOD AND APPLICATION THEREOF

(71) Applicants: XIAMEN NANOTECH CO LTD, Fujian (CN); NANOMATERIALS TECHNOLOGY PTE LTD, Singapore (SG)

(72) Inventors: Zhigang Shen, Singapore (SG); Wei Kian Soh, Singapore (SG); Jiyao Zhang, Singapore (SG); Aici Wang, Singapore (SG); Jie Zhong, Singapore (SG); Sung Lai Jimmy Yun, Singapore (SG); Hock Sing Sher, Singapore (SG); Jianfeng Chen, Singapore (SG)

(73) Assignees: Xiamen Nanotech Co Ltd, Fujian (CN); Nanomaterials Technology Pte Ltd, Singapore (SG)

( * ) Notice: Subject to any disclaimer, the term of this patent is extended or adjusted under 35 U.S.C. 154(b) by 23 days.

(21) Appl. No.: 15/719,332

(22) Filed: Sep. 28, 2017

(65) Prior Publication Data
US 2018/0031739 A1 Feb. 1, 2018

Related U.S. Application Data

(63) Continuation of application No. 14/388,697, filed as application No. PCT/CN2013/073240 on Mar. 27, 2013, now abandoned.

(30) Foreign Application Priority Data

Mar. 28, 2012 (CN) .......................... 2012 1 0086571

(51) Int. Cl.
| | | |
|---|---|---|
| G02B 1/14 | (2015.01) | |
| C03C 17/00 | (2006.01) | |
| B82Y 30/00 | (2011.01) | |
| C01G 19/00 | (2006.01) | |
| C01G 30/00 | (2006.01) | |
| C01G 30/02 | (2006.01) | |
| C08K 13/02 | (2006.01) | |

(52) U.S. Cl.
CPC ................ *G02B 1/14* (2015.01); *B82Y 30/00* (2013.01); *C01G 19/00* (2013.01); *C01G 30/00* (2013.01); *C01G 30/026* (2013.01); *C03C 17/007* (2013.01); *C03C 17/009* (2013.01); *C01P 2002/50* (2013.01); *C01P 2002/72* (2013.01); *C01P 2002/84* (2013.01); *C01P 2004/04* (2013.01); *C01P 2004/52* (2013.01); *C01P 2004/54* (2013.01); *C01P 2004/64* (2013.01); *C01P 2006/60* (2013.01); *C03C 2217/445* (2013.01); *C03C 2217/475* (2013.01); *C03C 2217/476* (2013.01); *C03C 2217/485* (2013.01); *C03C 2217/74* (2013.01); *C08K 13/02* (2013.01); *Y10T 428/2982* (2015.01)

(58) Field of Classification Search
CPC ........................................................ G02B 1/14
USPC ........................................ 252/587; 423/594.7
See application file for complete search history.

(56) References Cited

FOREIGN PATENT DOCUMENTS

| | | | |
|---|---|---|---|
| CN | 101439870 A | | 5/2009 |
| CN | 101580270 | * | 11/2009 |
| CN | 101580270 A | | 11/2009 |
| CN | 101723438 A | | 6/2010 |
| JP | 2005-187580 | | 7/2005 |
| JP | 2005-187680 | | 7/2005 |
| JP | 2011-065966 | | 3/2011 |

OTHER PUBLICATIONS

English Translation of International Preliminary Report on Patentability including Written Opinion of corresponding PCT/CN2013/073240, dated Oct. 1, 2014, 15 pages.

* cited by examiner

*Primary Examiner* — Monique R Peets
(74) *Attorney, Agent, or Firm* — Lewis Roca Rothgerber Christie LLP

(57) ABSTRACT

There is disclosed a tin-containing metal oxide nanoparticle, which has an index of dispersion degree less than 7 and a narrow particle size distribution which is defined as steepness ratio less than 3. There is disclosed dispersion, paint, shielding film and their glass products which comprise the said nanoparticles. Besides, there are also disclosed processes of making the tin-containing metal oxide nanoparticle and their dispersion. The tin-containing metal oxide nanoparticles and their dispersion disclosed herein may be applied on the window glass of houses, buildings, vehicles, ships, etc. There is provided an excellent function of infrared blocking with highly transparent, and to achieve sunlight controlling and thermal radiation controlling.

11 Claims, 10 Drawing Sheets

NANOMETRIC TIN-CONTAINING METAL OXIDE PARTICLE AND DISPERSION, AND PREPARATION METHOD AND APPLICATION THEREOF

CROSS-REFERENCE TO RELATED APPLICATION(S)

This application is a continuation of U.S. patent application Ser. No. 14/388,697, filed Sep. 26, 2014, which is a National Phase Patent Application and claims priority to and benefit of International Application Number PCT/CN2013/073240, filed Mar. 27, 2013, which claims priority to and benefit of Chinese Patent Application Number 201210086571.2, filed Mar. 28, 2012, the entire disclosures of which are incorporated herein by reference.

TECHNICAL FIELD

The present invention relates to a high transparency, low radiation, energy-saving composite material for glass, and more particularly, to tin-containing metal oxide nano-particles and their dispersion, the preparation methods of the nano-particles and dispersion, sunlight-control composition material comprising the tin-containing metal oxide particles or their dispersion, and the high transparency, low radiation and energy-efficient glass.

BACKGROUND

With the rapid development of science and technology and industrial production, energy resource and the environment increasingly attract whole social attention with higher demands for energy saving and environmental protection. Regarding to energy consumption, energy consumption from buildings accounts for nearly 40% of the total social energy consumption, of which the energy loss through the glass doors and windows in the building energy consumption reaches more than 50%, that is, the glass doors and windows has become the largest energy vulnerability of buildings. The main energy consumption within the building is due to heating and air conditioning. Improving windows heat insulation performance is an effective way to reduce building energy consumption. Energy saving performance of architectural glass, has become the key to achieve energy saving in buildings. To achieve energy-saving in architectural glass, the sunlight through the glass has to be controlled.

More than 99% of solar radiation spectrum is at the wavelength range of 0.15 to 4.0 μm. About 50% of solar radiation energy is in the visible region of the spectrum (wavelength of 0.4 to 0.76 μm), 3% in the ultraviolet (UV) spectral region (wavelength of <0.38 μm), 47% in the infrared (IR) region of the spectrum (wavelength of >0.76 μm), which near-IR ray is known as hotline. However, maximum transmittance of ordinary glass happens to be in the region of the solar radiation spectrum, meaning that its sunlight transmission is not influenced. It is necessary to achieve heat insulation and energy-saving in the constructions, automotive and ships through the glass coated sunlight control coating or film, thus saving energy for heating and air conditioning. Sunlight control refers to regulation of different wavelengths and heat energy of sunlight through glass products accessing to certain spaces (buildings, cars or ships internal). Apparently, under the premise without affecting space lighting, blocking and absorbing of UV and IR and reducing thermal radiation rate are effective ways to control sunlight. UV does not account for a large proportion in energy, but greatly harmful to the surface paint of furniture and human bodies, which is one of the reasons that anti-UV glass has been increasingly widely used. On the one hand, by reducing solar energy through sunlight control can obtain reduction of heat flux of accessing to certain space (building, car or ship), so that the space inside will keep cool, thus to reduce the need for air conditioning, finally to achieve purposes of energy saving and environmental protection. On the other hand, by reducing the heat radiation, the glass can become medium and far IR reflector, to reduce the heat flux through the glass outwardly, thereby reducing air conditioning requirements and the cost, to achieve the purpose of energy saving. improving window insulation performance by effective low thermal radiation coating can improve interior comfort in summer and winter.

For sunlight control and low thermal radiation properties and commercially acceptable coated glass article, the manufacturing considerations are cost, life and capabilities of maintaining the relative performances (solar transmittance, visibility, colour, transparency, and the shielding factor). Currently, methods for the preparation of coated glass for sunlight control and low thermal radiation are mostly magnetron sputtering, PVD, CVD coating and the thermal spray coating. Specifically, the additives which are against or absorb UV and IR, through the above methods, sputter or coat onto the glass to achieve effective control of sunlight into the room. Equipment prices by using above methods are expensive with restrictions on the substrate and the substrate shape, size. Furthermore, the methods are difficult to apply to existing glasses, therefore meeting a very limited commercial promotion. At present, coated glasses are mainly used in automotive, which market is basically monopolized by very expensive films from companies of the United States 3M, V-BEST, JOINNS, JOHNSON, and difficult to be extended to architectural glass.

Without aging concern, inorganic nano-additives can be used permanently, while organic additives usually aging with a life period. Therefore, commercial applications with inorganic additives is growing. Commercial inorganic additives with UV-blocking property are metal oxides, such as zinc oxide, titanium oxide and cerium. IR-blocking metal oxides are antimony tin oxide (ATO) and indium tin oxide (ITO). Another commercial inorganic additive absorbing IR is lanthanum hexaboride. In recent years, the rise of the glass insulation coating or film, are increasingly focused on the use of the metal oxide as an additive.

Ideally, the particles in the glass coating or film matrix must be less than the nominal particle diameter of 100 nm, in order to maintain the transparency and pellucidity of the original glass. This is one of the main reasons that nano-technology draw attentions in this area. In addition, the metal oxide nano-particles in the coating or film will not form a conductive film, therefore do not interfere with operation of the radiation transmitting and receiving devices within the protective structure glazing.

In the preparation of functional metal oxide dispersion, it is necessary to mix at least two sorts of metal oxide nano-particles with blocking UV or IR property in dispersions. The traditional method is to disperse metal oxide particles in certain solvent with some dispersant by ball milling or sanding milling. This simple powder reprocessing approach may cause serious aggregation, especially due to the high surface energy of nano-particles. Moreover, the uneven intensity of ball milling or sanding milling may lead to non-uniform secondary particle size of the dispersed particles; in addition, ball milling and sanding milling inevitably introduce impurities. Dispersion and the modification belonging to physical modification methods, affecting the stability of functional dispersion, which is difficult to maintain the particles in the dispersion in nanoscale and keep stable for long time. These will affect the application of the functional dispersion, ultimately affect the transparency and other properties of the glass coating or film.

Therefore, there is a need to develop tin-containing metal oxide nano-particles and their dispersions which are economically viable, high transparent and blocking UV and IR, able to use in the glass coating and film with good dispersion stability, overcome or ameliorate the above mentioned disadvantages.

Therefore, there is a need to invent a preparation method of tin-containing metal oxide nano-particles and their dispersions which are economically viable, high transparent and blocking UV and IR, able to use in the glass coating and film with dispersion stability, and overcome or ameliorate the above mentioned disadvantages.

SUMMARY OF THE INVENTION

The object of the present invention is to provide one kind of mono-dispersed, stable tin-containing metal oxide nano-particles, dispersions and glass composite materials, which have high transparency and IR blocking function. A further object of the present invention is to provide a low-cost mass production method of the above-mentioned tin-containing metal oxide nano-particles and the dispersion. Another object of the present invention is to provide the sunlight control composite material and glass products comprising the above-mentioned tin-containing metal oxide nano-particles or dispersion with high transparency and IR blocking (or simultaneously blocking UV and IR) function.

According to a first aspect, the present invention provides tin-containing metal oxide nano-particles, said tin-containing metal oxide including tin element and another metallic element except tin, wherein the tin-containing metal oxide nano-particles having the index of dispersion degree of less than 7, and size distribution in steepness ratio of less than 3.

In present invention, the tin-containing metal oxide contains the tin element and the other metallic elements in addition to tin, wherein said other metallic elements of the addition of tin including antimony, indium, titanium, copper, zinc, zirconium, cerium, yttrium, lanthanum, niobium, or mixtures thereof, preferably from the elements antimony, indium or mixtures thereof. In a preferred embodiment, the tin-containing metal oxide can be antimony tin oxide or indium tin oxide.

For the nano-sized tin-containing metal oxide of this invention, the preferred molar ratio of Sn to metal dopants is between 1:0.01~1:100, and more preferably, between 1:0.05~1:50, or 1:0.05~1:20, for instance, 1:0.05, 1:0.1, 1:0.15, 1:0.2, 1:5, 1:10, 1:15, 1:20.

The tin-containing metal oxide nanoparticles of this invention are crystallined with preferably tetragonal cassiterite structure, bixbyite structure, tetragonal cassiterite-like structure, or bixbyite-like structure.

Considering about the high transparency request of the thin film made by tin-containing metal oxide based composite for its application, the tin-containing metal oxide with low dimensionality is preferred. Advantageously, the average primary particle diameter of the tin-containing metal oxide nanoparticles stated in this invention is 2~50 nm, or 2~20 nm, or 2~10 nm.

The index of dispersion degree/index of steepness herein are measured from the said particles dispersion. The dispersibility of the tin-containing metal oxide nanoparticles in this invention is high in the dispersed medium, particularly for the mono-dispersion with index of dispersion degree less than 7, and more particularly, with the index of dispersion degree less than 5, or less than 4, or less than 3, or less than 2. The tin-containing metal oxide nanoparticles in this invention have a narrow particle diameter distribution with preferred steepness ratio less than 3, and more preferably, less than 2, or less than 1.8, or less than 1.5, or less than 1.3.

In one embodiment, there is surfactant coating on the surface of said tin-containing metal oxide nanoparticles.

According to a second aspect, there is provided a process of making tin-containing metal oxide nanoparticles comprising the steps of:

(1) Reacting a tin salt solution and doping metal salt solution together with a precipitant solution to form the tin-containing metal oxide precursor particles and the first ionic by-product;

(2) Separating said tin-containing metal oxide precursor particles and said first ionic by-product to obtain tin-containing metal oxide precursor particles substantially free of said ionic by-products;

(3) Reacting said tin-containing metal oxide precursor particles substantially free of said ionic by-products with oxidizing agent or reducing agent to form tin-containing metal oxide particles and the second ionic by-product;

(4) Separating said tin-containing metal oxide particles and said second ionic by-product to obtain tin-containing metal oxide nanoparticles substantially free of said ionic by-products.

In one optimized embodiment, the said tin-containing metal oxide nanoparticles are antimony-doped tin oxide nanoparticles. The process of making said antimony-doped tin oxide nanoparticles comprising the steps of:

(1) Reacting a tin salt solution and a antimony salt solution together with a precipitant solution in an aqueous medium phase at a pH of at least above 7 and at a temperature in the range of about 5~100 degree Celsius to form antimony-doped tin oxide precursor particles and the first ionic by-product;

(2) Separating said antimony-doped tin oxide precursor particles and said first ionic by-product to obtain antimony-doped tin oxide precursor particles substantially free of said ionic by-products;

(3) Transferring said antimony-doped tin oxide precursor particles substantially free of said ionic by-products into high temperature high pressure reactor, and reacting with oxidizing agent to form antimony-doped tin oxide particles and the second ionic by-product;

(4) Separating said antimony-doped tin oxide particles and said second ionic by-product to obtain antimony-doped tin oxide nanoparticles substantially free of said ionic by-products.

In one optimized embodiment, the said tin-containing metal oxide nanoparticles are indium-doped tin oxide nanoparticles. The process of making said indium-doped tin oxide nanoparticles comprising the steps of:

(1) Reacting a tin salt solution and a indium salt solution together with a precipitant solution in an aqueous medium phase at a pH of at least above 7 and at a temperature in the range of about 5~100 degree Celsius to form indium-doped tin oxide precursor intermedia product and the first ionic by-product;

(2) Separating said indium-doped tin oxide precursor particles and said first ionic by-product to obtain indium-doped tin oxide precursor particles substantially free of said ionic by-products;

(3) Transferring said indium-doped tin oxide precursor particles substantially free of said ionic by-products into high temperature high pressure reactor, and reacting with oxidizing agent to form indium-doped tin oxide particles and the second ionic by-product;

(4) Separating said indium-doped tin oxide particles and said second ionic by-product to obtain indium-doped tin oxide nanoparticles substantially free of said ionic by-products.

In one embodiment, in one or more steps of step (2), (3) and (4), there is surfactant coating on the surface of said tin-containing metal oxide precursor particles or tin-containing metal oxide particles.

In one optimized embodiment, based on the weight of the tin-containing metal oxide precursor particles or tin-containing metal oxide particles, 0.01%-30% surfactants are added in one or more steps of said step (2), (3) and (4).

According to a third aspect, there is provided a dispersion of tin-containing metal oxide nanoparticles which including disperse medium and tin-containing metal oxide nanoparticles as defined in the first aspect.

In one embodiment, based on the weight of dispersion, the solid content of said tin-containing metal oxide particles is at least 5%, more advantageously, the solid content is at least 10%, or at least 30%, or at least 40%, or at least 50%.

In one embodiment, the said disperse medium of said dispersion choose from water, acetic ether, butyl acetate, alcohols, alkene, aether, ketone, aromatic solvent and their mixture.

In one embodiment, the said tin-containing metal oxide nanoparticles of said dispersion have an index of dispersion degree which is less than 7 and particle diameter distribution that is defined by a steepness ratio of less than 3. More advantageously, said index of dispersion degree is less than 5, or less than 4, or less 3; and said steepness ratio is less than 2, or less than 1.8, or less than 1.5, or less than 1.3.

In one embodiment, the average secondary particle diameter of said tin-containing metal oxide nanoparticles of said dispersion is between about 2 nm to about 100 nm, particularly, between about 2 nm to about 50 nm.

According to a forth aspect, there is provided a dispersion of tin-containing metal oxide nanoparticles as defined in the third aspect produced in a method comprising the steps of:

(1) Reacting a tin salt solution and doping metal salt solution together with a precipitant solution to form the tin-containing metal oxide precursor particles and the first ionic by-product;

(2) Separating said tin-containing metal oxide precursor particles and said first ionic by-product to obtain tin-containing metal oxide precursor particles substantially free of said ionic by-products;

(3) Reacting said tin-containing metal oxide precursor particles substantially free of said ionic by-products with oxidizing agent or reducing agent to form tin-containing metal oxide particles and the second ionic by-product;

(4) Separating said tin-containing metal oxide particles and said second ionic by-product to obtain tin-containing metal oxide nanoparticles substantially free of said ionic by-products.

wherein, during one or more steps of step (2), (3) and (4), coating the said tin-containing metal oxide precursor nanoparticles or tin-containing metal oxide nanoparticles with a surfactant for step (5); and dispersing the tin-containing metal oxide nanoparticles into the dispersion medium system to result in highly dispersed dispersion of tin-containing metal oxide nanoparticles for step (6).

According to a fifth aspect, there is provided another dispersion of tin-containing metal oxide nanoparticles as defined in the third aspect produced in a method comprising the steps of:

(1) Reacting a tin salt solution and doping metal salt solution together with a precipitant solution to form the tin-containing metal oxide precursor particles and the first ionic by-product;

(2) Separating said tin-containing metal oxide precursor particles and said first ionic by-product to obtain tin-containing metal oxide precursor particles substantially free of said ionic by-products;

(3) Reacting said tin-containing metal oxide precursor particles substantially free of said ionic by-products with oxidizing agent or reducing agent to form tin-containing metal oxide particles and the second ionic by-product;

(4) Separating said tin-containing metal oxide particles and said second ionic by-product to obtain tin-containing metal oxide nanoparticles substantially free of said ionic by-products.

(5) Dispersing tin-containing metal oxide nanoparticles into the dispersion medium system again, and adjust pH value of the system to result in highly dispersed dispersion of tin-containing metal oxide nanoparticles.

In this invention, during the reaction of forming tin-containing metal oxide by reacting general tin salt solution and doping metal salt solution together with precipitant solution, beside the tin-containing metal oxide precursor particles and tin-containing metal oxide particles formed from the reaction of tin ions and doping metal ions with the oxo-anions in the precipitant, the soluble by-product of metal salt thereof is also formed. As the reactions usually generate in an aqueous medium phase, the by-product generally exist as ion form in the reaction system. 4 mole of ionic by-product is formed to obtain 1 mole of tin oxide as tin ions are tetravalent ions. During the reactions of forming tin-containing metal oxide precursor particles or tin-containing metal oxide particles, the surface energy of the particles are very high as they are in nano-scale, then a lot of the ionic by-products are quite easily to be adsorbed onto the particle surface which lead the particles unstable in the disperse medium and affect the dispersion stability and some other properties. During experiments, it is found by the inventor that if the ionic by-products and tin-containing metal oxide particles can be effectively separated, it is possible to disperse the tin-containing metal oxide particles into specific disperse medium to make good dispersion with high solid content.

In the process of making nano-sized tin-containing metal oxide in this invention, there are steps of choosing the amount of tin ion solution and doping metal ion solution included which make the molar ratio of metal dopant to tin of said tin-containing metal oxide in the range of 1:0.01~1: 100, more preferably, the molar ratio is in the range of 1:0.05~1:50, or 1:0.05~1:20, for instance, the molar ratio of 1:0.05, 1:01, 1:0.15, 1:0.2, 1:5, 1:10, 1:15 or 1:20.

In the process in this invention, the said surfactants can be added in any steps after the tin-containing metal oxide precursor formation in step (1), which means coating the tin-containing metal oxide precursor particles or tin-containing metal oxide particles with surfactants during one or more steps of step (2), (3) and (4). In one optimized embodiment, surfactant is added in step (4).

In one embodiment, after obtaining the tin-containing metal oxide particles and the ionic second by-product in step (3), separating the tin-containing metal oxide particles and by-product first and then adding dispersing agent to disperse the tin-containing metal oxide particles to form needed dispersion of tin-containing metal oxide particles in specific disperse medium.

In one embodiment, adding specific amount of acid solution during preparation of tin salt solution and doping metal salt solution to improve dissolving of metal salt mixture.

As there is characteristic difference between the tin-containing metal oxide particles (or tin-containing metal oxide precursor particles) and the ionic by-product, they can be separated effectively. In said separating step (2) and separating step (4), the separating of tin-containing metal oxide particles (or tin-containing metal oxide precursor particles) and the ionic by-product process can be chosen from any one of the following processes: liquid-liquid phase transfer, liquid-liquid phase transfer after washing, centrifuge after washing, filtering after washing. With any process, centrifuging for separation before liquid-liquid phase transferring, liquid-liquid phase transferring after washing, centrifuging after washing, filtering after washing and then the obtained precipitates are substantially tin-containing metal oxide particles (or tin-containing metal oxide precursor particles).

In one embodiment, during separating the particles and ionic by-product using liquid-liquid phase transfer, one of the aqueous phase liquid and another organic phase liquid are immiscible. The tin-containing metal oxide particles coated with surfactant are induced into the organic phase and the ionic by-products are left in the aqueous phase.

In one embodiment, separating the tin-containing metal oxide particles and ionic by-product by washing. For instance, another solvent will be added into the tin-containing metal oxide particle suspension for the ionic by-product dissolving in this solvent to make the tin-containing metal oxide particles stable. After removing the medium/solvent system which dissolving the ionic by-product from the tin-containing metal oxide particles, the tin-containing metal oxide particles coated with surfactant can be mono-dispersed in specific solvent.

During experiment, it is found that by the inventors the surface property of the tin-containing metal oxide particles can be modified by adding surfactant, and it is able to reduce or eliminate the particle agglomeration effectively comparing to the particles without surfactant coating. The most importance, choosing the suitable surfactant and right time for adding surfactant make the tin-containing metal oxide particles coated with certain amount of surfactant have good compatibility with the disperse medium, and achieve mono-disperse of tin-containing metal oxide particles in the dispersion system with high solid content.

In one embodiment, the obtained tin-containing metal oxide particles coated with surfactant are induced into the dispersion solvent medium and separated from the ionic by-product to form mono-dispersion of tin-containing metal oxide particles in above mentioned solvent phase. More advantageously, the tin-containing metal oxide particles coated with surfactant are not affected by ionic by-products which lead agglomeration in the dispersion solvent phase. Therefore, they are stabilized as mono-dispersion in the solvent phase.

In one embodiment, after separating the tin-containing metal oxide particles and the ionic by-products effectively and adding the tin-containing metal oxide particles into disperse medium, the highly dispersed dispersion of tin-containing metal oxide particles can be obtained by adjusting the pH value of the system with adding acid or alkali. For instance, during dispersing process, adding certain amount of organic alkali, like tetra-methylammonium hydroxide, to adjust pH to about 12.5 and make the dispersion as transparent mono-dispersion system. Similarly, the pH value of the mono-dispersion system can be adjusted between 0~14 according to different applications.

In one embodiment, based on the weight of tin-containing metal oxide nanoparticles dispersion, the solid content of said tin-containing metal oxide nanoparticles achieved is at least 5% without substantial agglomeration. More advantageously, the solid content of tin-containing metal oxide nanoparticles in dispersion achieved is at least 10%, or at least 25%, or at least 30%, or at least 40%, or at least 50%. Therefore, the mono-dispersion of tin-containing metal oxide particles produced by the said method in this invention is possibly to achieve very high particle content.

Surfactants can be expressed with formula of A-B. Group A is able to be absorbed onto the surface of tin-containing metal oxide particles and group B is solubilizing group (or called compatibility group). Group A is able to attach to the surface of tin-containing metal oxide particles through absorbing, formed ionic bond, formed covalent bond, or cooperation effects thereof. Group B can be active group or inactive group, and also can be polar group or non-polar group.

In one embodiment, more than one type of surfactant may be used. In this invention, the tin-containing metal oxide particles may be coated with a first surfactant, and then after further treatment, the corresponding groups of the first surfactant is at least partially exchanged, or replaced with the second surfactant to improve the compatibility of the tin-containing metal oxide particles with solvent of the disperse medium and for the enhancement of the dispersion of the tin-containing metal oxide particles in disperse medium.

In one embodiment, the tin-containing metal oxide particles coated with surfactant is further treated to at least partially remove the by-products formed by the reaction of anions from metal salt and cations from precipitant during synthesis process.

In one embodiment, the stability of the mono-dispersed tin-containing metal oxide particles can be maintained at room temperature and atmospheric pressure for at least 1 month without substantial agglomeration.

In one embodiment, the aqueous phased dispersion produced here can be fabricated as particle product which is in powder form.

According to a sixth aspect, there is provided a dispersion of nano-sized metal oxide composite which contains metal oxide nanoparticles for UV blocking and the tin-containing metal oxide nanoparticles for IR blocking. Particularly, the metal oxide nanoparticles for UV blocking can be chosen at least one from zinc oxide, titanium oxide, or cerium oxide.

In one embodiment, the zinc oxide, titanium oxide, or cerium oxide particles for UV blocking may be obtained following the method of patent PCT/SG 2008/00442, and the tin-containing metal oxide nanoparticles are obtained following the method described in the second aspect.

In one optimized embodiment, in the dispersion of metal oxide nano-composite which contains tin-containing metal oxide and zinc oxide (titanium oxide, and/or cerium oxide), based on the weight of the dispersion, the solid content of said zinc oxide (titanium oxide, and/or cerium oxide can be achieved to at least 5% without substantial agglomeration. More advantageously, the solid content of said zinc oxide (titanium oxide, and/or cerium oxide achieved can be at least 10%, or at least 25%, or at least 30%, or at least 40%, or at least 50%. Therefore, the stabilized dispersion of the metal oxide nano-composite which can be used in glass coating or shielding film for UV and IR blocking provided in this invention may achieve very high particle content. It provides great convenience and room for manoeuvre for the future formula recipe or manufacturing of glass coating or shielding film.

In one embodiment, there is provided a dispersion of metal oxide composite for UV and IR blocking in this invention wherein the average secondary particle diameter of the metal oxide nanoparticles for UV blocking is in the range of 2~100 nm, which has the index of dispersion degree less than 7 and particle distribution that is defined by a steepness ratio of less than 3.

According to a seventh aspect, there is provided a composite material for sunlight controlling which contain the tin-containing metal oxide nanoparticles, preferably as transparent and visible coating or film, and more preferably as glass paint or film.

In one optimized embodiment, there is provided a glass coating or glass shielding film which contains the tin-containing metal oxide nanoparticles for IR blocking and metal oxide nanoparticles for UV blocking.

According to an eighth aspect, there is provided a transparent and visible material, which contains the tin-containing metal oxide nanoparticles said in the first aspect, wherein the tin-containing metal oxide nanoparticles exist on the surface of and/or inside the said transparent and visible material.

In one optimized embodiment, the said tin-containing metal oxide nanoparticles exist on the surface of said transparent and visible material of the paint or film.

In one optimized embodiment, there is provided a glass product in this invention for sunlight controlling. The glass product is able to block UV and IR as its coating or shielding film as defined in the seventh aspect to achieve the purpose of sunlight controlling, energy saving and environment protection.

Definitions

The following words and terms used herein shall have the meaning indicated:

The term "metal" as used herein, is to be interpreted broadly to include all metals, including, for example, semi-metals, alkali metals, alkaline earth metals, transition metals and metals selected from the main groups of the Periodic Table of Elements.

The term "metal salt" is to be interpreted broadly to refer to a compound comprised of at least one anion and at least one cation. The anions and cations of the metal salt may be either simple (monatomic) ions such as $Na^+$, $Ag^+$, $Cu^+$, $Zn^{2+}$, $Ca^{2+}$, $Fe^{2+}$, $Cu^{2+}$, $Fe^{3+}$, $Ce^{3+}$, $Al^{3+}$, $Ce^{4+}$, $Cl^-$, or complex (polyatomic) ions such as $CH_3COO^-$, $NO_3^{2-}$, $SO_4^{2-}$. At least one of the cations in the metal salt is a metal.

The term "metal salt solution" is to be interpreted broadly to refer to a metal salt dissolved in a solvent, such as an aqueous solvent, or an organic solvent (i.e. methanol, ethanol), or mixture of aqueous and organic solvents, or a mixture of organic solvents.

The term "precipitant solution", as used herein, is to be interpreted broadly to include any solute dissolved in a solvent that, when added to a metal salt solution, causes a precipitate to form or crystals to grow. The precipitant may include alkaline solutions such as an alkaline base, more particularly an oxygen-containing base.

The term "oxygen-containing base" is to be interpreted broadly to include any molecule or ion that contains an oxygen atom which can form a bond with a metal ion by donating a pair of electrons. Exemplary oxygen-containing bases include alkali metal hydroxides (i.e. NaOH, LiOH, KOH), alkaline earth metal hydroxides (i.e. $Ca(OH)_2$), an ammonia solution (i.e. $NH_4OH$), alkali metal carbonates (i.e. $Na_2CO_3$, $K_2CO_3$), alkali hydrogen carbonates (i.e. $NaHCO_3$, $KHCO_3$), organic base (i.e. $(CH_3)_4NOH$) or a mixture thereof.

The term "nano" or "nano-sized" as used herein relates to an average particle diameter of less than about 100 nm.

The term "narrow particle diameter distribution", as used herein, is to be interpreted broadly to refer to a steepness ratio, as measured on a SediGraph, of the precipitate particles being less than about 3. The size distribution of the precipitate particles in a given composition may be represented on a SediGraph which plots cumulative mass percent as a function of particle diameter. Where cumulative mass percent is the percent, by weight, of a distribution having a particle diameter of less than or equal to a given value and where particle diameter is the diameter of an equivalent spherical particle. The mean particle diameter in a distribution is the size in nanometers of the precipitate particles at the 50% point on the SediGraph for that distribution. The width of the particle diameter distribution of a given composition can be characterized using a steepness ratio. As used herein, the "steepness ratio" is defined as the average diameter of the particles in the ninetieth mass percentile ($d_{90}$) divided by the average diameter of the particles in the tenth mass percentile ($d_{10}$).

The term "surfactant", as used herein, is to be interpreted broadly to relate to any composition that is capable of altering surface tension between a liquid and any precipitated particles suspended in the liquid. Suitable surfactants are taught in McCutcheon's Emulsifiers & Detergents, at pages 287-310 of the North American Edition (1994), and in McCutcheon's Emulsifiers & Detergents, at pages 257-278 and 280 of the International Edition (1994), both published by MC Publishing Co. (McCutcheon Division) of Glen Rock, N.J. "Dispersant" or "dispersing agent", as used herein, is defined as an assistant agent which is able to improve and modify the dispersibility of the precipitate particles in medium. Dispersant is a type of surfactant. The types of surfactant include anionic, cationic, non-ionic, amphoteric and polymeric type.

The term "oxidizing agent" and "reducing agent" are to be interpreted broadly as following: "oxidizing agent" is a substance to gain electrons or have electron bias in oxidation-reduction reaction, which means it is a substance with valence state change from high to low during reaction. The oxidizing agent is reduced to reduction product by gaining electrons from reducing agent. The oxidizing agent and reducing agent are interdependent to each other. "Reducing agent" is a substance to lose electrons or have electron deviation in oxidation-reduction reaction. Reducing agent is to be interpreted broadly as anti-oxidation agent. It has reducibility, and become oxidation product after being oxidized. Oxidation reaction and reduction reaction may be undertaken at the same time, wherein the reduction reaction of reducing agent with being reduced substance, the reducing agent is oxidized and become oxide. The substance with valence state increasing during reaction is reducing agent. Exemplary reducing agents include ethylenediamine, oxalic acid, formalin, acetaldehyde, hydrazine hydrate, sodium borohydride, metals, non-metals, i.e. Sn, $H_2$, C, etc. Exemplary oxidizing agents include peroxide, i.e. $Na_2O_2$, $K_2O_2$, $H_2O_2$, peracetic acid, etc.

The term "non-polar solvent" is to be interpreted broadly to include an organic liquid in which the positive and negative charges substantially coincide. Thus, a non-polar solvent does not ionize or impart electrical conductivity. Exemplary non-polar solvents include t-butylmethyl ether, methyl ether, and other ethers of lower alkyl groups; aliphatic and aromatic hydrocarbons, such as hexane, octane, cyclohexane, benzene, decane, toluene, and the like; symmetrical halocarbons, such as carbon tetrachloride; petroleum ether; and the like. Mixtures of non-polar liquids can be used.

The term "polar solvent", which is contrary to "non-polar solvent", is to be interpreted broadly to include a liquid in which the positive and negative charge does not coincide. Thus, a polar solvent ionize or impart electrical conductivity. Normally, a solvent's polarity is determined roughly by the dielectric constant of the solvent. Solvent with a dielectric constant more than 15 is considered a polar solvent. Exemplary polar solvents include water, alcohols such as acetone and methyl ethyl ketones; epoxides; and ethyl acetate. Mixture of polar liquids can be used.

The term "aqueous medium" as used herein, is to be interpreted broadly to include any medium which comprises water, optionally in admixture with additional solvents such as organic polar solvent. Exemplary organic polar solvents are alcohols, amides, ketones, epoxides and mixture thereof. Typically, the organic polar solvents have a relatively low number of carbon atoms, such as about 1 to about 10 carbon atoms, or 1 to 6 carbon atoms.

The term "ionic impurity" or "ionic by-product" is to be interpreted broadly to the by-product in ionic form in reaction system formed in the process of making tin-containing metal oxide by reacting tin salt solution and doping metal salt solution together with precipitants, i.e. $Na^+$, $K^+$, $Cl^-$, $NH^{4+}$, $NO_3^-$, $CH_3COO^-$, $SO_4^{2-}$, small amount of $Sn^{4+}$, $Sb^{3+}$, $In^{3+}$, and other doping metal ions without complete hydrolysis containing tin, antimony or indium.

The term "liquid-liquid phase transfer" is to be interpreted broadly to include the preferential movement of solutes, residues, or any matter of interest into one of an immiscible pair of liquid phases.

The term "washing" is to be interpreted broadly to add aqueous medium into the system containing precipitate particles to dissolve or further dissolve the ionic by-products in the system containing precipitate particles to achieve effective separation of the ionic by-products and the precipitate particles through post phase transfer, centrifuge or filer of the ionic by-products.

The term "average primary particle diameter", is related to the average particle diameter before dispersion of the metal oxide particles in disperse medium. Normally, it is measured ($d_{TEM}$) by Transmission Electron Microscopy (TEM).

The term "average secondary particle diameter" relate to average primary particle diameter, which is the average particle diameter after dispersion of the metal oxide particles in disperse medium. Normally, it is measured ($d_{DLS}$) by Dynamic Light Scattering instrument (DLS).

The term "monodispersion" as used herein, in conjunction with metal oxide particles, is to be interpreted broadly to refer to an index of dispersion degree of metal oxide particles in liquid medium. In general, the "index of dispersion degree" is defined as the average particle diameter of the secondary (or aggregated) particles divided by the average primary particle diameter of the particles. Therefore, the smaller the index of the dispersion degree, the closer the dispersion is to a monodispersion. Typically, a monodispersion may have an index of dispersion degree of less than 7 and no less than 1. Generally, the term "monodispersion" means that the particles loaded in the liquid medium do not substantially agglomerate or clump together with other particles but remain substantially dispersed in the liquid medium.

The word "substantially" does not exclude "completely" e.g. a composition which is "substantially free" from Y may be completely free from Y. Where necessary, the word "substantially" may be omitted from the definition of the invention.

The term "comprising" and "comprise", are intended to represent "open" or "inclusive" language such that they include recited elements but also permit inclusion of additional, unrecited elements, As used herein, the term "about", in the context of concentrations of components of the formulations, typically means+/−5% of the stated value, more typically +/−4% the stated value, more typically +/−3% the stated value, more typically +/−3% the stated value, even more typically +/−1% the stated value, and even more typically +/−0.5% the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5 and 6. This applies regardless of the breadth of the range.

DETAILED DISCLOSURE OF EMBODIMENTS

Exemplary, non-limiting embodiments of a process of making dispersion of nano-sized tin-containing metal oxide for glass paint or shielding film for IR blocking are disclosed. The process comprising the steps of:

(1) Reacting a tin salt solution and a doping metal (i.e. Sb, In) salt solution with a precipitant solution under conditions to form tin-containing metal oxide precursor particles and first ionic by-product;

(2) Separating said tin-containing metal oxide precursor particles and said first ionic by-product to obtain tin-containing metal oxide precursor particles substantially free of said ionic by-products;

(3) Transferring said tin-containing metal oxide precursor particles substantially free of said ionic by-products into high temperature high pressure reactor, and reacting with oxidizing agent or reducing agent under high temperature and high pressure condition for certain time, to form tin-containing metal oxide particles and the second ionic by-product;

(4) Coating said tin-containing metal oxide particles with a surfactant;

(5) Separating said surfactant coated tin-containing metal oxide particles and said second ionic by-product to obtain tin-containing metal oxide nanoparticles substantially free of said ionic by-products;

(6) Dispersing the said surfactant coated tin-containing metal oxide particles substantially free of said ionic by-products into selected disperse medium system to obtain dispersion of nano-sized tin-containing metal oxide with high dispersion;

(7) Comprising the dispersion of nano-sized tin-containing metal oxide and nano-sized zinc oxide (titanium oxide, and/or cerium oxide) in the same solvent medium to obtain stabilized dispersion of metal oxide nano-composite for both UV and IR blocking.

In one embodiment, the tin salt and/or metal salt for making nano-sized tin-containing metal oxide may be selected from the group consisting of a metal acetate salt, a metal halide salt, a metal nitrate salt, a metal phosphate salt, a metal sulphate salt, a metal chlorate salt, a metal borate salt, a metal iodate salt, a metal carbonate salt, a metal perchlorate salt, a metal tartrate salt, a metal formate salt, a metal gluconate salt, a metal lactate salt, a metal sulfamate salt, hydrates and mixture thereof.

In one embodiment, the precipitant solution may be a base solution. The base solution may be an oxygen-containing base solution. The oxygen-containing base solution may be selected from the group consisting of alkali metal hydroxides, alkaline earth metal hydroxides, alkali metal carbonates, alkaline earth metal carbonates, alkaline earth metal hydrogen carbonates, ammonia, organic base and mixture thereof. Exemplary oxygen-containing bases are solution of $LiOH$, $NaOH$, $KOH$, $NH_3$, $H_2O$, $Be(OH)_2$, $Mg(OH)_2$, $Ca(OH)_2$, $Li_2CO_3$, $Na_2CO_3$, $K_2CO_3$, $KHCO_3$, $(CH_3)_4NOH$ or mixtures thereof. It is to be appreciated that the base solution may be used to control the pH during the reacting step. This may substantially minimize the need to stop the reaction half-way in order to adjust the pH to a desired value to simplify the process.

The base solution can be formed by dissolving a base (i.e. such as NaOH or KOH) solid in a solvent. The solvent may include water, an organic liquid (i.e. such as alcohol) or mixtures thereof.

The reacting step in step (1) for making tin-containing metal oxide precursors may be undertaken in an open chamber or an enclosed chamber. The reacting step may be undertaken at a temperature of less than or about 100 degrees Celsius. The reacting step may be undertaken at a temperature in the range of about 5 to about 100 degrees Celsius. In one embodiment, the reacting temperature is in the range of about 50 to about 80 degrees Celsius. The reacting step is undertaken at atmospheric pressure and the reacting step is undertaken for time duration of less than about 90 minutes. In one embodiment, the time required for the reacting step is about 60 minutes or less. In another embodiment, the time required for the reacting step is less than about 20 minutes. In a further embodiment, the time required for the reacting step is less than about 10 minutes. The reacting step for forming tin-containing metal oxide precursors may be undertaken in non-acidic conditions, which means the reacting step may be undertaken in substantially neutral or substantially alkaline conditions.

The precipitation reacting step in step (1) need to choose suitable amount of tin salt solution and doping metal salt solution to make the molar ratio of the metal dopant to tin in the tin-containing metal oxide in the range of about 0.01 to about 100, or about 0.05 to about 50, or about 0.05 to about 20, or about 0.1 to about 10. In one embodiment, the molar ratio of the metal dopant to tin in the tin-containing metal oxide is in the range of 0.05 to 19.

In one embodiment, the precipitation reacting step in step (1) is undertaken in substantially alkaline conditions. In another embodiment, the reacting step is undertaken at a pH in the range of at least about 7.0 or at least about 8.5 or at least about 10. In another embodiment, the reacting step is undertaken at a pH in the range of about 8.5 to about 9.5. It is to be appreciated that an alkaline condition may aid in the formation of tin-containing metal oxide precursors.

In one embodiment, the reacting step for tin-containing metal oxide formation may be undertaken in a substantially polar phase. The polar phase may be an aqueous medium phase. The aqueous medium may be comprised of at least one of water, alcohols, amides, ketones, epoxides or mixtures thereof. The alcohols may be methanol, ethanol, isopropanol or n-propanol.

In one embodiment, the starting pH value of the tin salt solution and doping metal salt solution (i.e. Sb, In) may be adjusted by addition of acid or alkaline into the aqueous medium.

The separation of tin-containing metal oxide precursors and the by-products is undertaken by phase transfer, phase transfer after washing, centrifuge after washing, or filtering after washing of the tin-containing metal oxide precursors particles and the ionic by-products formed from reaction of tin salt solution and doping metal (i.e. Sb, In) salt solution with precipitant solution to achieve the purpose of separation.

The high temperature high pressure hydrothermal reacting step in step (3) described above is undertaken in an enclosed chamber. The reacting step is undertaken at a temperature of more than 100 degree Celsius and at a pressure in the range of 1 to 20 atmospheres. The pressure is normally self-generated by the solution system under enclosed chamber and heating condition. In one of the embodiment, the reacting step is undertaken at a temperature in the range of about 150 to about 400 degree Celsius and at a pressure in the range of about 5 to about 10 atmospheres. In another embodiment, the reacting step is undertaken at a temperature in the range of about 200 to about 400 degree Celsius. In a further embodiment, the reacting step is undertaken at a temperature in the range of about 300 to about 400 degree Celsius and for time duration of more than about 1 hour. In one embodiment, the time required of the reacting step is about or less than about 3 hours. In another embodiment, the time required of the reacting step is more than about 8 hours. In a further embodiment, the time required of the reacting step is more than about 10 hours.

In step (4) the surfactant can be selected from the group consisting of: anionic surfactants, cationic surfactants, non-ionic surfactants, polymeric surfactants and mixtures thereof. The surfactant selected herein may comprise of silane coupling agents, non-silane surface modifying agents, titanate coupling agents, or mixtures thereof.

Exemplary surfactants are silane coupling agents. Silane coupling agents are a type of silicon-containing organic compound which may be represented by the formula $YSiX_3$, where X is alkyl group or alkoxy group, and where Y is alkyl group, oxoalkyl group, amino group or phenyl group, etc. Silane coupling agents may improve the compatibility between organic and inorganic compound, they may also improve and enhance the physical chemical properties, like strength, toughness, electrical properties, water resistance, and corrosion resistance, of composite materials. Exemplary silane coupling agents are include, but not limited to, Trialkoxy silane, (Methyl) acryloxy-alkoxy-trialkoxy silane, Acryloyloxy-alkoxy-trialkoxy silane, (Methyl) acryloyloxy-alkyl-alkyl-dialkoxy silane, Acryloyloxy-alkyl-alkyl-dialkoxy silane, (Methyl) acryloyloxy-alkyl-dialkyl-alkoxy silane, Acryloyloxy-alkyl-dialkyl-alkoxy silane, Thiol-alkoxy-trialkoxy silane, γ-Methacryloxypropyltrimethoxy silane, Aryl-trialkoxy silane, Vinyl silane, 3-Glycidyloxypropyl-trialkoxy silane, Polyether silanes, γ-Aminopropyl-triethoxy silane, γ-Glycidyloxypropyltrimethoxy silane, γ-(Methacryloyloxy) propyl-trimethoxy silane, γ-Mercaptopropyltrimethoxy silane, γ-Aminoethyl-aminopropyl-trimethoxy silane, Bis-propyl-triethoxy silane, N-(β-Aminoethyl)-γ-(aminopropyl)-methylbimethoxy silane, N-(β-Aminoethyl)-γ-(aminopropyl)-trimethoxy silane, γ-Aminoethyl-aminopropyl-trimethoxy silane, Hexadecyltrimethoxy silane, combinations thereof.

Non-silane surface modifying agents reactive and compatible with organic matrix material include, for example, sodium dodecyl sulphate, sodium lauryl sulphate, sodium laurate, sodium oleate, sodium naphthenate, sodium stearate, sodium abietate, sodium iso-octoate, sodium linoleate, sodium caproate, sodium ricinate, ethyl acetate, sodium acetate, dioctylsodium sulphosuccinate, TWEEN™ (polyoxyethylene sorbitan monooleate), SPAN 80™ (sorbitan monooleate), SPAN 85™ (sorbitan trioleate), PLURONIC™, polysorbate, N-polyvinyl pyrrolidone, polyethylene glycol, polyoxyethylene, bis-2 hydroxyethyl oleyl amine, hexadecyltrimethyl ammonium bromide, hydroxypropyl cellulose, hydroxypropylmethyl cellulose, maltose sugar, sucrose, citric acid, ethylene glycol, acrylic acid, methacrylic acid, (3-hydroxyethyl acrylate, tetraethyl orthosilicate and mixtures thereof.

There are four types of titanate coupling agents including: monoalkoxy type, pyrophosphate type, chelating type and coordinating type. Titanate coupling agents may be represented by formula $ROO_{(4-n)}Ti(OX—R'Y)_n$ (n=2, 3), where RO— is alkoxy group with short chain which is able to be hydrolysis, and reactive with hydroxyl group on the surface of inorganic compound to achieve chemical coupling; where OX— may be carboxyl group, alkoxy group, sulfonic acid group, phosphate group, etc. These groups are important to decide the specific function of titanate coupling agents, for example, sulfonic acid group may induce the thixotropy of the organic compound, and pyrophosphate acyloxy groups have the properties of flame resistance, anti-rust and adhesion enhancement. Phosphorous acyloxy groups may provide properties of antioxidant, flame resistance, etc. Therefore, the titanate coupling agents may have both coupling property and other specific functions by OX— selection; R'— is alkyl group with long chain, it is soft and may be bended and entangle with organic polymers to modify the compatibility between organic and inorganic compound and improve the strength of impact resistance of the material; Y is hydroxyl group, amino group, epoxy group or groups with double bond, etc. These groups connect to the end of the titanate molecules, and may be bonded with organic compound by chemical reaction. Titanate coupling agents have both great flexibility and multi-functionality. They may be coupling agent themselves, and also may be dispersion agent, wetting agent, adhesion agent, crosslinking agent, catalyst, etc. Titanate coupling agents also have the functions of anti-rust, antioxidation, flame resistance, etc.

When the surfactant is used for dispersion, the surfactant selection is based on the following conditions: if the dispersion of tin-containing metal oxide is formed with water as the disperse medium, the dispersing agents may be selected from: ethanolamine, triethanolamine, triethylamine, diisopropanolamine, tetramethylammonium hydroxide, sodium metaphosphate, sodium hexametaphosphate, polyvinyl alcohol, methacryloxy silane, polyacrylic acid ammonium salt dispersing agent, polyacrylic acid sodium salt dispersing agent, polysiloxane dispersing agent, polyamide dispersing agent, polymeric block copolymer, more mixtures thereof; if the dispersion of tin-containing metal oxide is formed with organic solvent as the disperse medium, the dispersing agents may be selected from: polycarboxylic salt dispersing agent, polycarboxylic-sulfonic copolymer dispersing agent, polymaleicanhydride copolymer dispersing agent, silane coupling agent, titanate coupling agent, or mixtures thereof.

The coating step in step (4) may comprise the step of selecting the concentration of the surfactant based on the mass of tin-containing metal oxide from the group consisting of: about 0.01% to about 30%; about 0.01% to about 20%; about 0.01% to about 10%; about 0.01% to about 5%; about 0.01% to about 1%; about 0.1% to about 30%; about 0.5% to about 30%; about 1% to about 30%; about 5% to about 10%; about 0.1% to about 5%. In one embodiment, the mass concentration of the surfactant is selected in the range of about 0.01% to about 30%.

The surfactant may bind to the tin-containing metal oxide particles in its supplied form or may undergo a chemical reaction such as hydrolysis before binding to the tin-containing metal oxide particles. The binding of surfactant or the derived product of the surfactant to the tin-containing metal oxide particles may be reversible or irreversible. In one embodiment, the binding may be caused by intermolecular interactions selected from the group consisting of: ion-ion interactions, Van der waals forces of attraction, hydrophobic interactions, dipole-dipole interactions, covalent bonding or a combination thereof. In another embodiment, the binding may result in the tin-containing metal oxide particles being completely or incompletely coated by the surfactant or its derivative.

The tin-containing metal oxide particles are coated or modified to improve their compatibility to organic matrix (such as polymers), and then to achieve a compound consisting of both tin-containing metal oxide particles and zinc oxide (titanium oxide, and/or cerium oxide) for application of glass paint or shielding film in organic matrix to block UV and IR and to make the glass highly transparent and energy conservation. The compatibility of the tin-containing metal oxide particles to the organic matrix materials of the final dispersion product is decide by the solvent type used during separating step. For example, if organic solvent is used in separating step, the polymers may be include, but not limited to, polystyrene, polymethyl methacrylate, polycarbonate, polyurethane, etc.; if polar solvent is used in separating step, the polymers may be include, but not limited to, polyvinyl acetate, polyvinyl butyral, etc.

In one embodiment, an organic solvent may be added to the surfactant coated the tin-containing metal oxide particles to result in a two-phase system comprising an organic medium phase and an aqueous medium phase that may be partially or completely immiscible with each other. The organic medium phase may be selected from the group consisting of alkanes, alkenes, ethers, ketones, and aromatic solvents. In one embodiment, the organic medium phase is a non-polar organic solvent, such as toluene, or an alkane such as heptane, hexane, octane, or decane.

The surfactant coated tin-containing metal oxide particles may report to the organic phase while the ionic by-products remain in the aqueous phase. Hence, the ionic by-products may be separated from the tin-containing metal oxide particles via liquid-liquid phase transfer.

The surfactant may be selected such that the surfactant coated tin-containing metal oxide particles have a higher affinity for the organic medium phase relative to the aqueous medium phase. The inventors have found that the use of surfactants may aid in the preferential movement of the surfactant coated tin-containing metal oxide particles to the organic phase. While not intending to be bound by theory, this phenomenon may be due to the alteration of the surface properties of the tin-containing metal oxide particles as they are coated with the surfactant such that the surfactant coated tin-containing metal oxide particles are relatively more hydrophobic than tin-containing metal oxide particles not coated with the surfactant.

In one embodiment, the surfactant is selected such that a monodispersion of the tin-containing metal oxide particles is formed. Preferably, the selected surfactant comprises of a stearically large organic group. The inventors have found that the coating of the surfactant on the particles may aid in the formation of a monodispersed tin-containing metal oxide in the organic phase. Without being bound by theory, this may be due to the stearic hindrance between the organic groups of the surfactant coated tin-containing metal oxide particles which may aid in effectively keeping the tin-containing metal oxide particles from coagulating together. Furthermore, the surfactant may be selected to enable the tin-containing metal oxide particles to report to the organic medium phase while the ionic by-products remain in the aqueous phase.

In another embodiment, an aqueous medium may be added into the surfactant coated tin-containing metal oxide particles to substantially dissolve ionic by-products. The tin-containing metal oxide particles settle to the bottom of the reaction mixture and can be separated from the by-products via centrifugation or any other physical separation process such as filtration. The by-products remain in the supernatant and are decanted after centrifugation. The tin-containing metal oxide particles can be re-dispersed to form a monodispersion in the polar medium. The polar medium phase may be selected from the group consisting of water, ethyl acetate, alcohols and ketone solvents.

The solid content of the monodispersion of the tin-containing metal oxide particles may be at least about 5%, or at least about 25%, or at least about 30%, or at least about 40%, or at least about 50% by weight. Accordingly, a high concentration of the tin-containing metal oxide particles may be present in the monodispersion.

In one embodiment, the tin-containing metal oxide particles are antimony-doped tin oxide or indium-doped tin oxide.

The tin-containing metal oxide particles may have an average secondary particle diameter of about 2 nm to about 100 nm; about 2 nm to about 50 nm; about 5 nm to about 50 nm; about 10 nm to about 100 nm; about 50 nm to about 100 nm; about 2 nm to about 100 nm. The tin-containing metal oxide particles may have a narrow particle diameter distribution in that the steepness ratio of the final tin-containing metal oxide particles in dispersion is less than about 3, or less than about 2, or less than about 1.8, or less than about 1.5, or less than about 1.3. The tin-containing metal oxide particles are substantially monodispersed and may have an index of dispersion degree less than about 7, or less than about 5, or less than about 4, or less than about 3, or less than about 2.

The process may comprise after the separating step in step (2) and (5), the step of washing the tin-containing metal oxide particles (or tin-containing metal oxide particle precursors) with an aqueous medium. The step of washing the tin-containing metal oxide particles with aqueous medium may remove any unwanted by-products that may be ionic in nature that have not been completely removed in separating step. The removal of unwanted by-products may aid in increasing the stability of the monodispersion of tin-containing metal oxide particles.

The aqueous medium used during the washing step may be the same or may be different than that used during the reacting step. In the washing step, the aqueous medium may be selected from water, alcohols, amides, ketones, epoxides, or mixtures thereof. In one optimized embodiment, one or more alcohols selected from the group consisting of methanol, ethanol, propanol, isopropanol, n-propanol and mixture thereof may be in admixture with the water. In one embodiment, the volume amount of alcohol relative to water solvent may be in the range selected from the group consisting of about 1% to about 99%; about 10% to about 99%; about 20% to about 99%; about 30% to about 99%; about 40% to about 99%; about 50% to about 99%; about 60% to about 99%; about 70% to about 99%; about 80% to about 99%; about 90% to about 99%.

The washing aqueous medium added to the organic phase medium may be at least partially miscible with the reaction medium comprising the tin-containing metal oxide particles. The tin-containing metal oxide particles in the above mixed medium may precipitate out from the mixed medium. The tin-containing metal oxide particles can be separated by centrifuging and washed again with aqueous medium.

In some embodiments, it may be necessary to re-disperse the formed tin-containing metal oxide particles in dispersion medium. The dispersion medium may be selected from the group consisting of water, ethyl acetate, butyl acetate, alcohols, alkenes, ethers, ketones, aromatic solvents, and mixtures thereof. More particularly, the dispersion medium may be selected from, but not limited to, the group consisting of water, ethyl acetate, butyl acetate, butyl ester, toluene, and ethanol.

The type of dispersion medium chosen may be dependent on the type of the end-product required. For example, if the end-product requires the use of a polar solvent, the tin-containing metal oxide particles may be re-dispersed in a polar solvent. Alternatively, if the end-product requires the use of a non-polar solvent, the tin-containing metal oxide particles may be re-dispersed in a non-polar solvent.

In reacting step (1) or (3), during both of the process of reacting step to form tin-containing metal oxide particle precursors and the process of hydrothermal under high temperature and high pressure condition to form tin-containing metal oxide particles, a shear force may be applied to the mixture of metal salt solution and precipitant solution to form tin-containing metal oxide particles with small particle diameter, and have a narrow particle diameter distribution characterized in that the steepness ratio is less than about 3, or less than about 2, or less than about 1.9, or less than about 1.8, or less than about 1.7, or less than about 1.6, or less than about 1.5, or less than about 1.3.

The monodispersing of the tin-containing metal oxide particles is defined with the index of dispersion degree is less than about 7, or less than about 5, or less than about 3, or less than about 2, or less than about 1.2.

The process may further comprise the step of agitating the solution during the reacting step to induce the shear force. The shear force induced may have a Reynolds number in the range selected from the group consisting of 2000-200000, 5000-150000, and 8000-100000. The substantially high Reynolds number may enable a high degree of mixing in said reaction zone. In one embodiment, the agitating step to induce the shear force during the reacting step may be provided by an agitator and shearing means as previously disclosed in the International Patent Application number PCT/SG02/00061, the disclosure of which is herein incorporated as reference.

BRIEF DESCRIPTION OF DRAWING

The accompany drawing illustrate a disclosed embodiment and serves to explain the principles of the disclosed embodiment. It is to be understood, however, that the drawings are designed for purposes of illustration only, and not as a definition of the limits of the invention.

FIGS. 1A and 1B are optimized schematic diagrams of the flow chart described in this invention, wherein FIG. 1A is the schematic diagrams of the flow chart for implementing the process for the production of tin-containing metal oxide particles and their dispersion, and FIG. 1B is the schematic diagrams of the flow chart for implementing the process for the further production of dispersion of nano-sized metal oxide composite.

FIG. 2A was obtained at 50 k magnification and FIG. 2B was obtained at 500 k magnification.

FIG. 7A was obtained at 50 k magnification and FIG. 7B was obtained at 500 k magnification.

FIG. 8A was obtained at 50 k magnification and FIG. 8B was obtained at 500 k magnification.

FIG. 12A shows the UV part of the spectrum, and FIG. 12B shows the whole spectrum.

DETAILED DESCRIPTION OF DRAWINGS

Figure 1A:
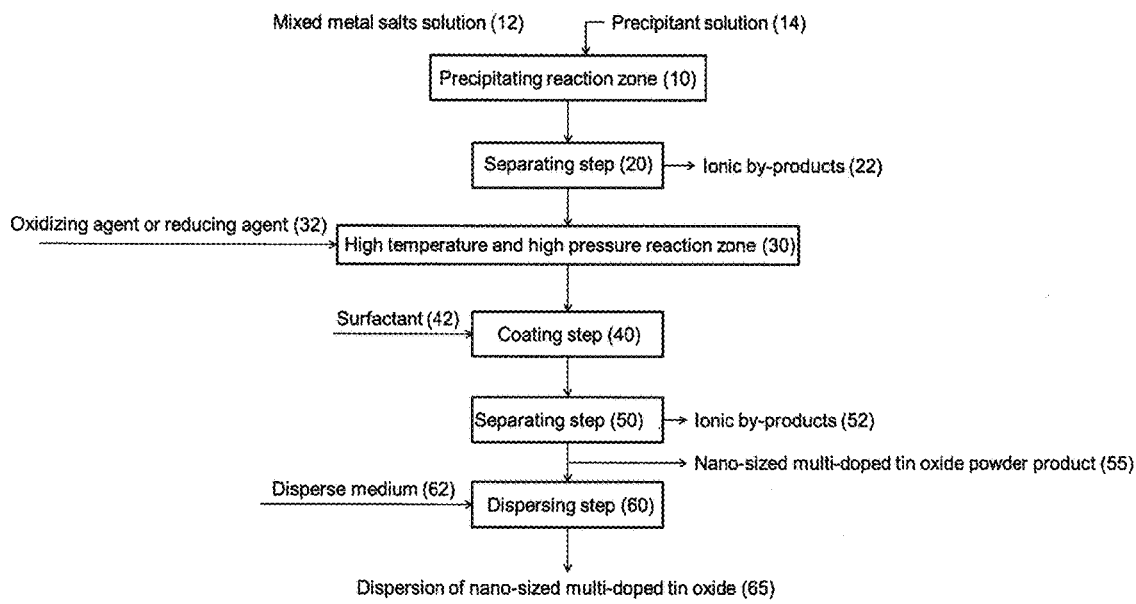

Referring to FIG. 1A, there is provided a process for the preparation of the dispersion of other metal-doped tin oxide. In the first step, a mixed metal salts solution (12) formed by mixing tin salt solution and other metal salt solution (such as mixed salt solution of tin chloride and antimony chloride) is mixed with a precipitant solution (14), which is alkali (such as potassium hydroxide, sodium hydroxide or ammonia solution). The precipitating reaction is carried out in a reaction zone (10) which may be a beaker, a flask or a reactor. A shear force is applied to the mixture during the mixing and reacting step. The reaction zone (10) is typically maintained at a temperature of between 5 degrees Celsius to 95 degrees Celsius, at atmospheric pressure and at a pH of 7.5 to 10. Within the reaction zone (10), the tin-containing metal oxide precursor particles and the by-products thereof are formed.

The separation of the tin-containing metal oxide precursor particles and the by-products thereof is carried out during the separating step (20) to remove the ionic by-products (22). In the high temperature and high pressure reaction zone (30), both tin-containing metal oxide precursor particles and oxidizing agents (or reducing agents based on the requirement of the doping agent) are added, for antimony-doped tin oxide, normally oxidizing agent is required and for indium-doped tin oxide, normally reducing agent is required. The reacting step to the tin-containing metal oxide precursor solution is maintained for a certain time under high temperature and high pressure condition, and a shear force is applied to the mixture to ensure the uniformly formation of the tin-containing metal oxide crystalline particles. The high temperature and high pressure reaction zone is typically maintained at a temperature of between 120 degrees Celsius to 500 degrees Celsius and at a pressure of between 1 atmosphere to 20 atmospheres.

The suspension of tin-containing metal oxide is taken from the high temperature and high pressure reaction zone, and a surfactant (42) is added for coating (40) of the tin-containing metal oxide particles. The surfactant may be selected from, but not limited to, the group consisting of oleic acid, sodium oleate, sodium abietate, sodium stearate, sodium octoate, sodium linoleate, hexadecyltrimethyl ammonium bromide, silane coupling agent, titanate coupling agent, sugar, ethylene glycol, maltose, citric acid, sodium citrate or mixtures thereof.

After the coating step, the ionic by-products in the tin-containing metal oxide crystalline particles are removed during a separating step (50) such as phase transfer, or washing methods, etc.

Optionally, a dispersing agent is added to the tin-containing metal oxide crystalline particles after removing the ionic by-products for further dispersion. For dispersing agent selection, if the disperse medium is water, one or more dispersing agents may be selected from, but not limited to, the group consisting of: ethanolamine, triethanolamine, triethylamine, diisopropanol amine, tetramethylammonium hydroxide, sodium metaphosphate, sodium hexametaphosphate, polyvinyl alcohol, methacryloxy silane, polyacrylic acid ammonium salt dispersing agent, polyacrylic acid sodium salt dispersing agent, polysiloxane dispersing agent, polyamide dispersing agent, polymer block copolymer dispersing agent; if the disperse medium is an organic solvent, one or more dispersing agents may be selected from, but not limited to, the group consisting of: polycarboxylic salt dispersing agent, polycarboxylic-sulfonic copolymer dispersing agent, polymaleicanhydride copolymer dispersing agent, silane coupling agent, titanate coupling agent. The concentration of the surfactants and dispersing agents mentioned above is in the range of about 5% to about 20% based on the weight of tin-containing metal oxide particles.

After that, the tin-containing metal oxide crystalline nanoparticles may be dried by traditional methods (such as oven drying, spray drying, rotary-evaporation drying, etc.) to form tin-containing metal oxide powder product (55), or added into disperse medium (62) for dispersing (60) to produce dispersion of nano-sized tin-containing metal oxide (65).

Optionally, if the disperse medium is water, the dispersion of tin-containing metal oxide particles in aqueous phase may be obtained by adjusting the pH value of the dispersion.

Figure 1B:
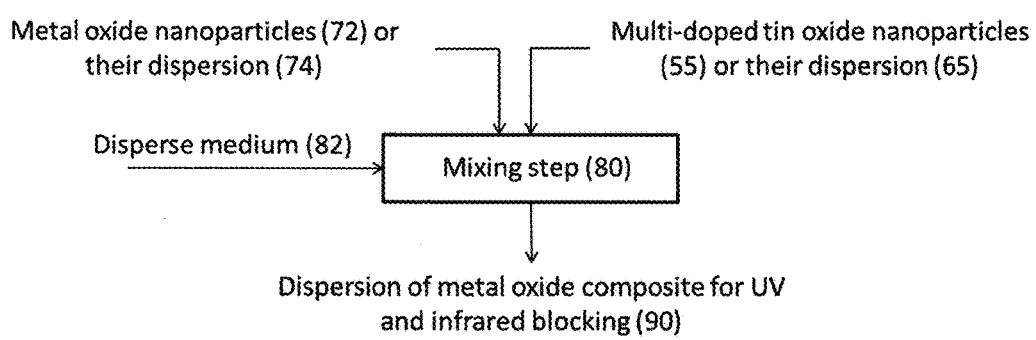

Referring to FIG. 1B, a disperse medium (80) is further used for mixing (80) of tin-containing metal oxide nanoparticles (55) or their dispersion (65) prepared according to FIG. 1A which may block IR and nano-sized metal oxide such as zinc oxide, titanium oxide and cerium oxide nanoparticle (72) or their dispersions (74) with good compatibility which may block UV to form a dispersion of metal oxide composite (80) for both UV and IR blocking.

In one embodiment, an organic solvent, such as hexane, is added to the mixture of tin-containing metal oxide crystalline particles after modified by surfactants and ionic by-products.

For example, in a reaction to produce antimony-doped tin oxide (ATO) from $SnCl_4$ and $SbCl_3$ mixed metal salt solution (12) and ammonia solution as precipitant solution (14), the ionic by-products may include $Cl^-$, $NH_4^+$, small amount of $Sn^{4+}$, $Sb^{3+}$ and ions without completely hydrolysed containing tin and antimony. During the process of separating the antimony-doped tin oxide crystalline particles and the ionic by-products, the phase transfer method is used normally as the tin-containing metal oxide crystalline particles coated with specific surfactant are easily to be dissolved in organic phase, hence after adding the organic solvent, the tin-containing metal oxide crystalline particles are completely dissolved or suspended as monodispersion in the organic phase, while the ionic by-products are remained in the aqueous phase solution.

An immiscible mixture of an organic phase medium an aqueous phase medium is formed. The aqueous phase medium containing the ionic by-products may be separated from the organic phase medium by liquid-liquid phase separating apparatus (such as a separating funnel).

In another embodiment, an aqueous medium is added to the mixture of the tin-containing metal oxide particles and the ionic by-products, such as water, alcohols, amides, ketones, epoxides, or mixtures thereof, to wash and further dissolve the ionic by-products; the tin-containing metal oxide crystalline particles settle to the bottom of the reaction mixture and can be separated from the ionic by-products via centrifugation or any other physical separation process (such as filtration). The ionic by-products remain in the supernatant and are decanted after centrifugation. The tin-containing metal oxide particles can be re-dispersed to form monodispersion in the polar medium.

The resultant tin-containing metal oxide particles are freely dissolved in a suitable solvent (62) to form a highly concentrated monodispersion (65) that comprises the surfactant coated tin-containing metal oxide crystalline particles. If an organic solvent is used in the separating step (50), the resultant tin-containing metal oxide particles are dissolved or dispersed (60) in the organic phase medium. If a polar solvent is used in the separating step (50), the resultant tin-containing metal oxide particles are dissolved or dispersed (60) in the polar phase medium. While the medium (62) used for dissolving or dispersing may be the same as or different from the one used in the separating step (20 or 50).

EXAMPLE

The present invention will be further described in greater details by reference to specific examples, which should not be considered as in any way limiting the scope of the invention.

Example 1

350.8 g of tin tetrachloride pentahydrate dissolved in 1 L of 2.5M diluted hydrochloric acid, and then 22.8 g of antimony trichloride was added under vigorous stirring to a solution of tin tetrachloride, maintaining the vigorous stirring to form a uniform suspension.

During the vigorous stirring, 1 L of 6M aqueous ammonia was added to the suspension, then keep at 60° C. for 20 min. The resulting pale yellow slurry was centrifuged and re-dispersed into 1.5 L of water, then centrifuged again, and repeated the above procedure until nearly no ionic impurities.

The resulted filter cake was re-dispersed in around 1 L of water, and transferred to a hydrothermal reactor with adding 100 ml of hydrogen peroxide. The slurry was heated to 250° C., and held for 8 hours.

When the hydrothermal reactor was cooled to room temperature, the dark blue slurry was centrifuged and washed by water, then centrifuged to obtain a cake.

The cake was re-dispersed to about 600 mL of water, adding 7.5 g of triethanolamine, then add 300 mL of methanol solution containing 22.5 g of cetyl trimethyl ammonium bromide and stirred for about 10 min. The slurry was centrifuged, and dispersed into 1.5 L of water, centrifuged again, washed with water and acetone to remove excess surfactants and ionic impurities. The cake obtained by centrifugation was re-dispersed into 600 mL of acetone and evaporated under reduced pressure until dryness without acetone.

A further quantity of toluene, and 3 g octylamine were added to finally form blue ATO dispersion in toluene with the solid content of nano-particles (based on the weight of the dispersion) at 40%.

Figure 2A:
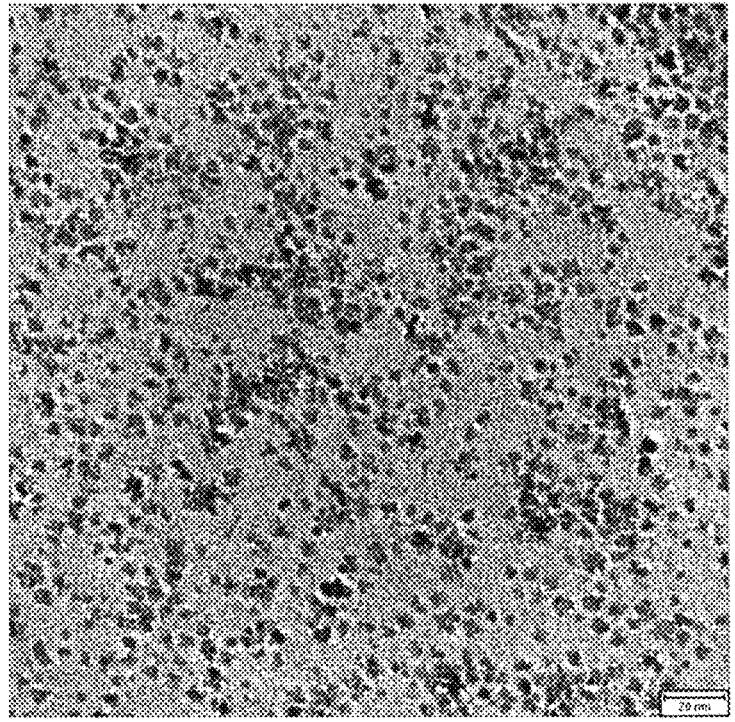
FIGS. 2A and 2B show the high resolution transmission electron microscope (HRTEM) images of monodispersed ATO nanoparticles prepared in example 1 below.
Figure 2B:
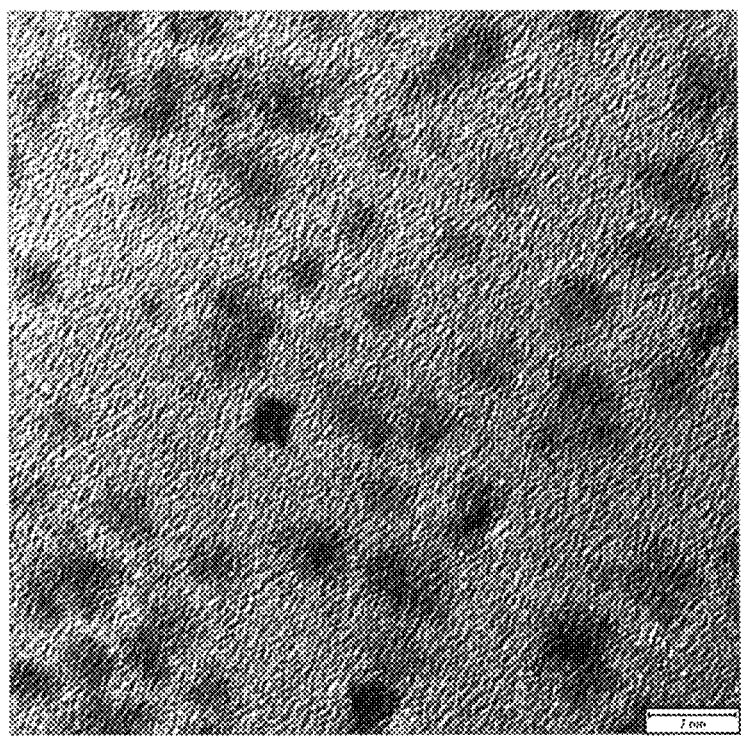
Figure 3:
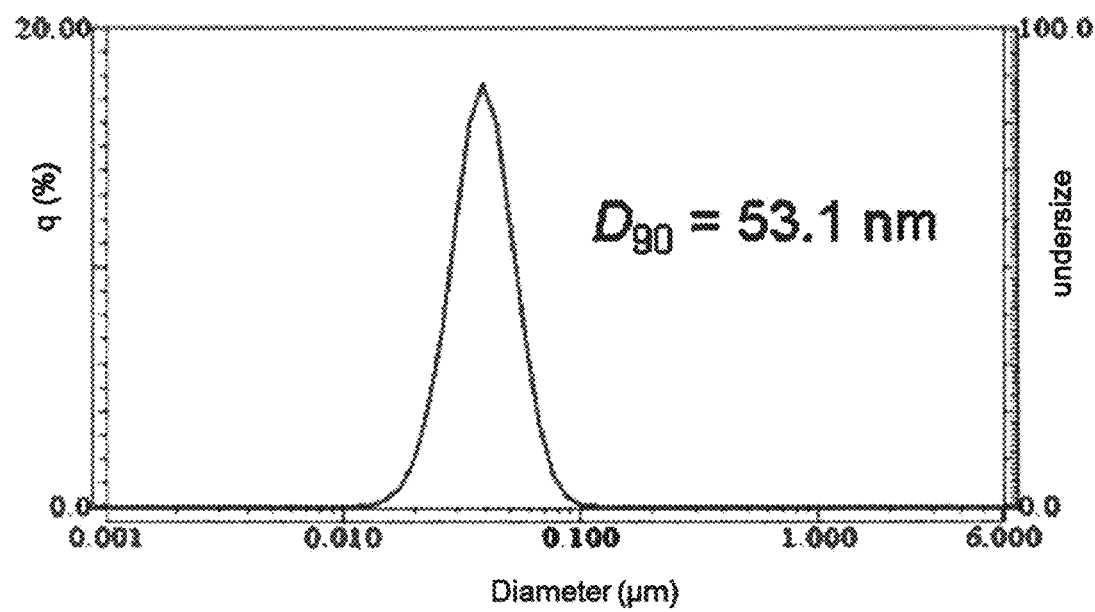
FIG. 3 shows a dynamic light scattering (DLS) pattern of the monodispersed ATO nanoparticles prepared in example 1 below.

FIGS. 2A and 2B showed TEM results indicating that the initial average particle diameter of the prepared ATO was between 5 to 7 nm, non-agglomerated among particles, nearly monodispersion. FIG. 3 showed a dynamic light scattering particle diameter analyzer test results indicating that the secondary average particle diameter was about 30 nm, D 90=53.1 nm. The resultant dispersion of the granules was the index of dispersion degree of 5.4, steepness ratio of 2.5, indicating that the particles have good dispersing properties in dispersion.

Comparative Example 1

350.8 g of tin tetrachloride pentahydrate was dissolved in 1 L of 2.5M diluted hydrochloric acid, then adding 22.8 g of antimony trichloride with vigorous stiffing until forming a uniform suspension.

During the vigorous stirring, 1 L of 6M aqueous ammonia was added to the suspension and keep at 60° C. for 20 min.

The resulted pale yellow pigment slurry was transferred to the hydrothermal reactor, with adding 100 mL of hydrogen peroxide. The slurry was heated to 250° C. and maintained for 8 hours.

When hydrothermal reactor cooling down to room temperature, the blue-gray slurry was collected and centrifuged to obtain a cake.

The cake even after washing many times still cannot get a dark blue cake similar to examples 1. Additionally, this filter cake even washed and re-modified in any case, can not be dispersed to form a monodispersed dispersion.

After drying the cake analysed by XRD tests, showing that despite cassiterite tetragonal structure (JCPDS21-1250) peaks appeared, but there were many impurity peaks. Dynamic light scattering particle diameter analyzer displayed that the average secondary particle diameter was greater than 1 .mu.m, with wide and bimodal particle diameter distribution.

This comparative example illustrates that tin-containing metal oxide precursor particles (or tin-containing metal oxide particles) separating in time with an ionic by-product is a very key step to the preparation and the formation of monodispersed dispersion of tin-containing metal oxide.

Example 2

Steps before the hydrothermal treatment and hydrothermal treatment conditions and procedures were the same to described in Example 1.

When hydrothermal reactor cooling down to room temperature, blue slurry was collected and centrifuged, then washed and dispersed in water, centrifuged again to obtain a cake.

The cake was re-dispersed to 1 L of methanol with 2.5 g of tetramethyl ammonium hydroxide and 500 mL of methanol containing 44.5 g of Titanate coupling agent (product name: NDZ-311) and stirred for 10 min. The slurry was centrifuged and sufficiently dispersed into 1 L of methanol and centrifuged again. The sediment was redispersed into 600 mL of butyl acetate, together with 7.5 g of another titanate coupling agent (product name: NDZ-109). The suspension was evaporated to dryness under reduced pressure to collect the dark blue powder.

The powder was re-dispersed into the butyl acetate to the solid content of ATO nano-particles (based on the weight of the dispersion) at 40%.

The test results showed that the particle diameter and size distribution of nano-ATO was similar to example 1. The resulting dispersion of the particles have the index of dispersion degree of 5.5 and the steepness ratio of 2.6.

Example 3

350.8 g of tin tetrachloride pentahydrate was dissolved in 1.5 L of methanol, then adding 22.8 g of antimony trichloride with stirring to a clear solution.

During the stirring, 1 L of 6M aqueous ammonia was added to the solution and maintained at 60° C. for 30 min.

The resulted pale yellow slurry was centrifuged and re-dispersed into 1.5 L of water, centrifuged again, repeated the above procedure until nearly no ionic impurities.

The resulted cake was re-dispersed into 1 L of water and transferred to hydrothermal reactor, with adding 100 mL of hydrogen peroxide. The slurry was heated to 290° C. and maintained for 8 hours.

When hydrothermal reactor cooling down to room temperature, the blue slurry was collected and centrifuged, then washed and dispersed with water, and centrifuged to obtain a dark blue cake.

The cake was re-dispersed into 600 mL of water, with 7.5 g of tetramethyl ammonium hydroxide and 300 mL of methanol solution containing 22.5 g of cetyl trimethyl ammonium bromide and stirred for 10 min. The slurry was centrifuged and dispersed into 1.5 L of water, centrifuged again, washed with water and acetone separately to remove excess surfactants and ionic impurities, to obtain the cake, which was re-dispersed into 600 mL of acetone. The suspension was evaporated to dryness under reduced pressure to remove acetone.

A certain quantity of toluene and 3 g octylamine were added to finally form a blue toluene dispersion of ATO nano-particles with the solid content (based on the weight of the dispersion) at 40%.

Figure 4:
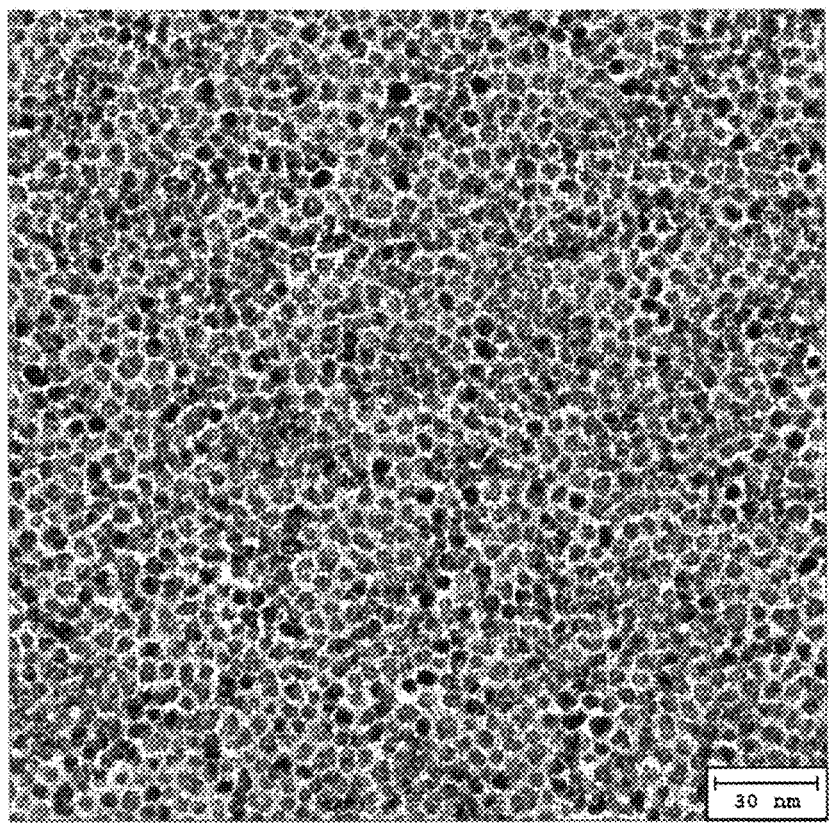
FIG. 4 shows the HRTEM images of monodispersed ATO nanoparticles prepared in example 3 below. It was obtained at 50 k magnification.
Figure 5:
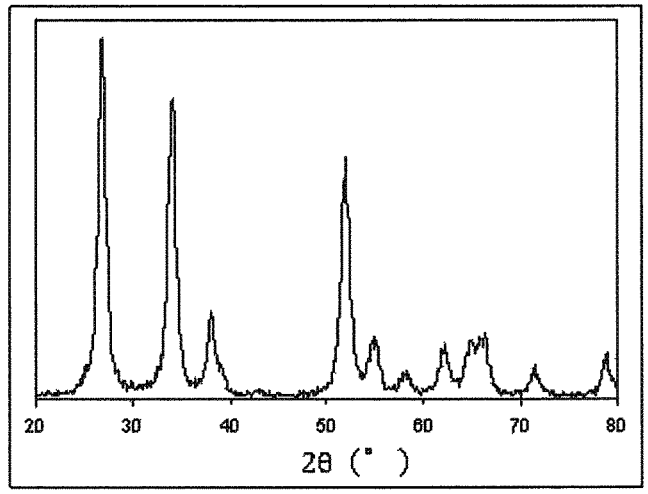
FIG. 5 shows an X-ray Diffraction (XRD) pattern of monodispersed ATO nanoparticles prepared in example 3 below.
Figure 6:
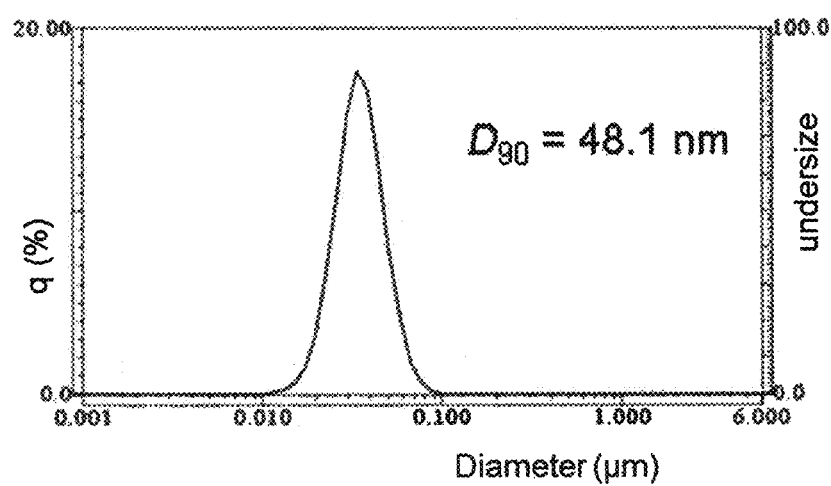
FIG. 6 shows a DLS pattern of the monodispersed ATO nanoparticles prepared in example 3 below.

The particle diameter and XRD tests was performed. FIG. 4 showed TEM results indicating that the obtained initial average particle diameter of the prepared individual ATO nanoparticles were 5 to 6 nm, no aggregation among particles, nearly monodispersion. XRD results in FIG. 5 showed the tetragonal cassiterite structure (JCPDS 21-1250) without impurity peak, indicating is doped antimony oxide was not in the form of a separate oxide, but into the crystal lattice of tin oxide. FIG. 6 of a dynamic light scattering particle diameter analyzer test results showed that the average secondary particle diameter of about 22 nm, D 90=48.1 nm. The resulted index of dispersion degree in the dispersion was 3.5 and steepness ratio 1.9, indicating a narrow particle diameter distribution in dispersions.

Example 4

Steps before the hydrothermal treatment and hydrothermal treatment conditions and procedures were the same to described in Example 3.

When hydrothermal reactor cooling down to room temperature, blue slurry was collected and centrifuged, then washed and dispersed by 1.5 L of water, centrifuged again to obtain a cake, which was re-dispersed to 1.5 L of 30% aqueous ethanol and centrifuged. The filter cake was dispersed in 70% aqueous ethanol and centrifuged. The resulted cake was redispersed into 1 L of ethanol and centrifuged to obtain a cake.

The last filter cake was dried at about 50° C. and pulverized to obtain ATO powder.

The amount of water was added to the dry powder, then 1% weight of ATO of tetramethyl ammonium hydroxide was added, treated by a homogenizer to disperse ATO uniformly in water, and finally to form the water-based dispersion of ATO nano-particles with the solids content (based on the weight of the dispersion) at 40%.

Figure 7A:
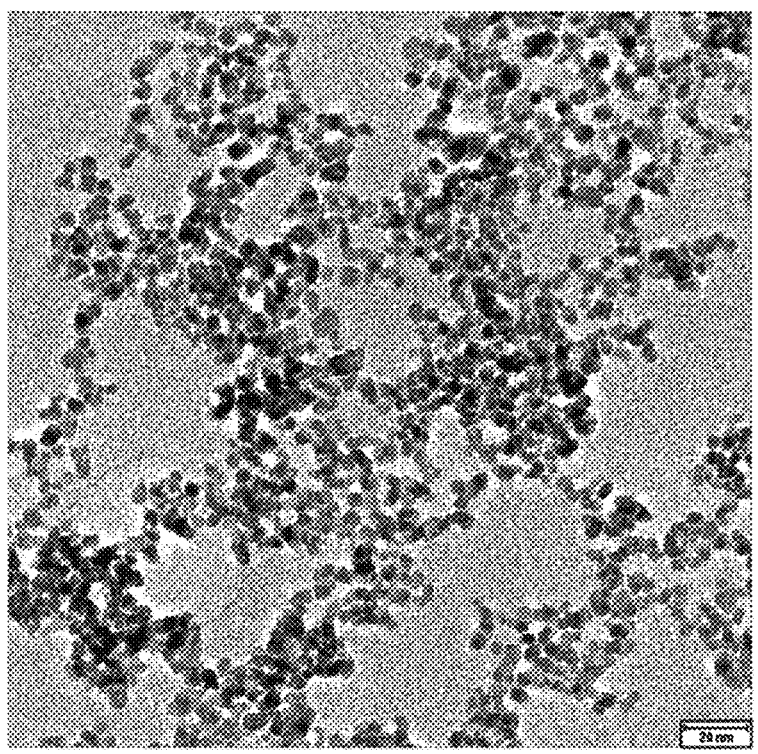
FIGS. 7A and 7B show the HRTEM images of monodispersed ATO nanoparticles prepared in example 4 below.
Figure 7B:
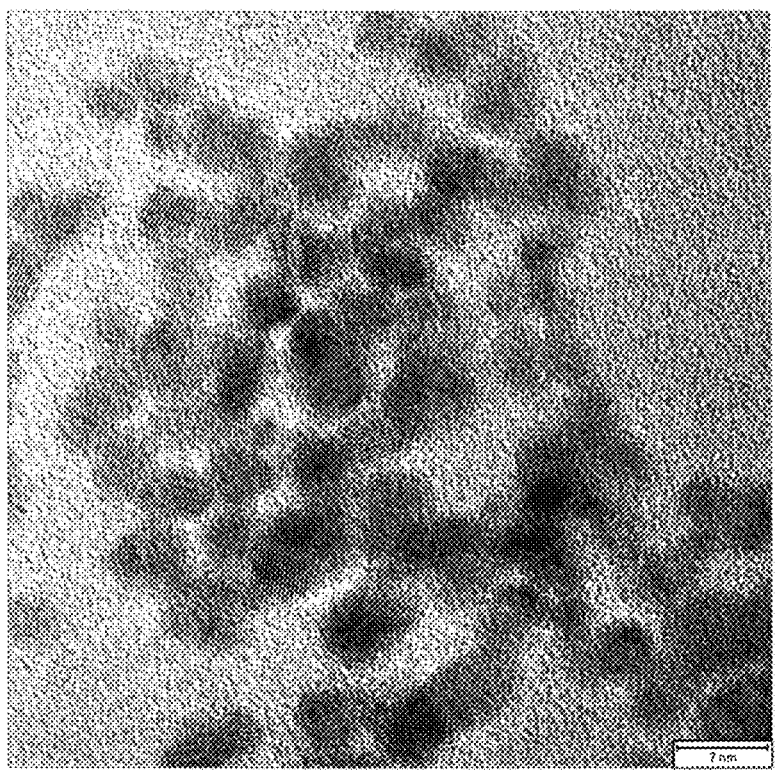

FIGS. 7A and 7B showed TEM results indicating that uniform size of ATO nano-particles with the initial average particle diameter of the individual particles of about 8 to 10 nm. XRD results showed that the structure of tetragonal cassiterite structure (JCPDS 21-1250). A dynamic light scattering particle diameter analyzer showed that the average secondary particle diameter was about 50 nm. The resulted dispersion of the particles have the index of dispersion degree of 4.2 and the steepness ratio of 2.2.

Example 5

Steps before the hydrothermal treatment and hydrothermal treatment conditions and procedures were the same to described in Example 3.

When hydrothermal reactor cooling down to room temperature, blue slurry was collected and centrifuged, then washed and dispersed by 1.5 L of water, centrifuged again. Dark blue filter cake was re-dispersed in an aqueous methanol solution (methanol and water by weight ratio of 9:1) to form 100 ml of suspension with solid content at 30%, which was warmed to 60-70° C. Under stirring, 7 g of γ-methacryloxypropyl trimethoxy silane was added and maintained for 1 day. Then, the slurry was cooled to room temperature, after adding 2 g of cetyl trimethyl ammonium bromide, and stirred for 10 minutes.

The suspension was washed, centrifuged and separated to obtain a cake.

The filter cake was dispersed by ethanol, then added 1 g of octylamine. After rotary evaporation, butyl acetate was added to obtain the dark blue nano-ATO dispersion in the dispersion medium of butyl acetate with the solid content at 40%.

Particle diameter and size distribution of ATO nanoparticles is similar to Example 3. The resulted dispersion of the particles have the index of dispersion degree of 5.2 and the steepness ratio of 2.1.

Example 6

35.08 g of tin tetrachloride pentahydrate was dissolved in 1.5 L of methanol with 293 g indium trichloride tetrahydrate under stirring to a clear solution.

During stirring, 1 L of 6M aqueous ammonia was added to the previous solution, and maintained for 30 min at 60° C. The resulted slurry was centrifuged and re-dispersed into 1.5 L of water, centrifuged again, and repeated the above procedure until nearly no ionic impurities.

The filter cake was re-dispersed in 1 L of water and transferred to hydrothermal reactor, with adding 100 mL of hydrazine hydrate. The slurry was heated to 290° C. and maintained for 8 hours.

When hydrothermal reactor cooling down to room temperature, the blue slurry was collected and centrifuged, then washed and dispersed with water, and centrifuged to obtain a cake.

The cake was re-dispersed into 600 mL of water, with 7.5 g of tetramethyl ammonium hydroxide and 300 mL of methanol solution containing 22.5 g of cetyl trimethyl ammonium bromide and stirred for 10 min. The slurry was centrifuged and sufficiently dispersed into 1.5 L of water, centrifuged again, washed with water and acetone separately to remove excess surfactants and ionic impurities, to obtain the cake, which was re-dispersed into 600 mL of acetone. The suspension was evaporated to dryness under reduced pressure to remove acetone.

A certain quantity of toluene and 3 g octylamine were added to finally form a dark blue toluene dispersion of ITO nano-particles with the solid content (based on the weight of the dispersion) at 40%.

Figure 8A:
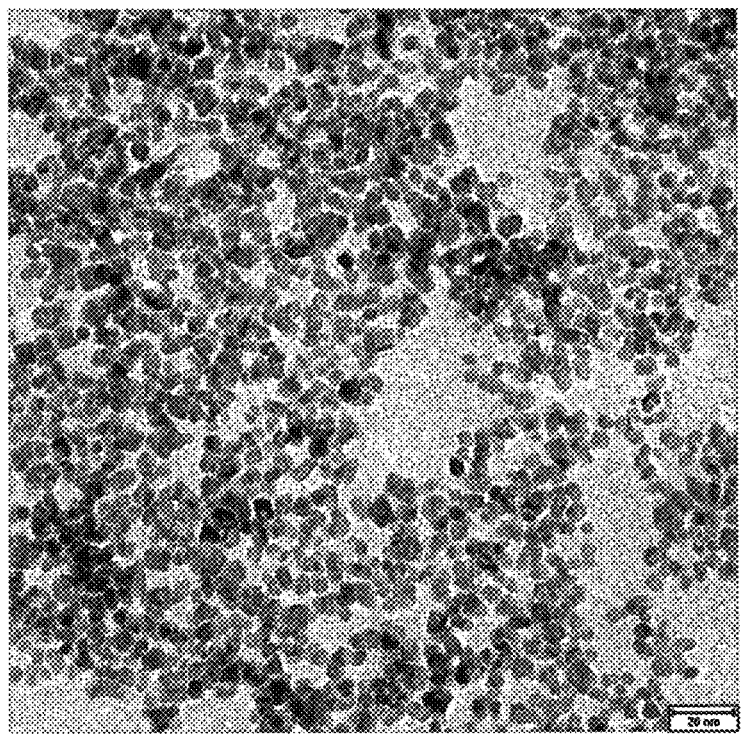
FIGS. 8A and 8B show the HRTEM images of monodispersed ATO nanoparticles prepared in example 6 below.
Figure 8B:
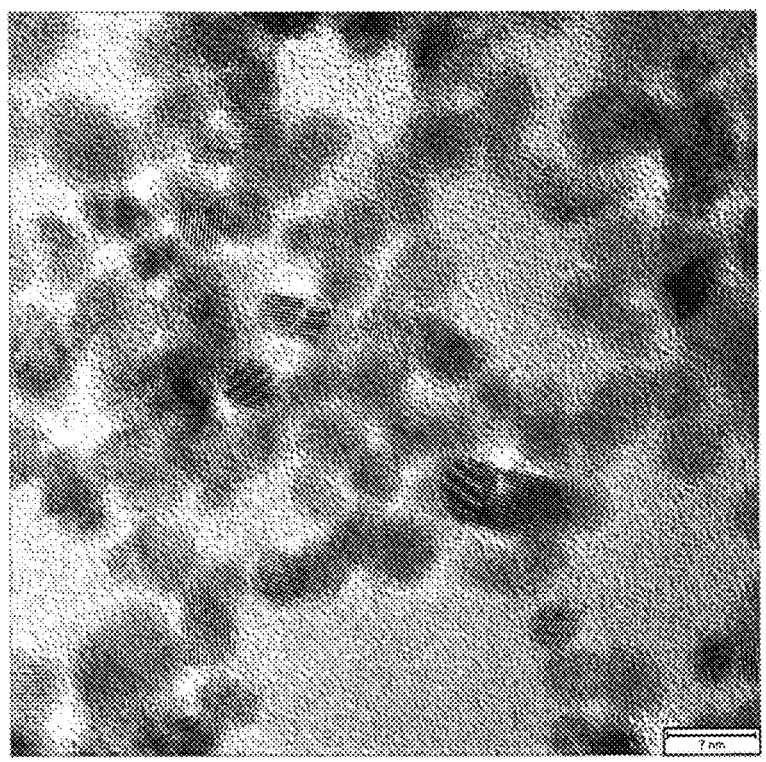

FIGS. 8A and 8B showed TEM results that the initial average particle diameter of individual ITO nanoparticles was about 7 nm. A dynamic light scattering particle diameter analyzer showed that the average secondary particle diameter was about 60 nm. The resultant dispersion have index of dispersion degree of 6.4 and steepness ratio of 2.7.

Example 7

35.08 g of tin tetrachloride pentahydrate was dissolved in 1.5 L of water containing hydrochloric acid, then adding 293 g of indium trichloride tetrahydrate under stirring to form a clear solution.

During stirring, 1 L of 6M aqueous ammonia solution was added to the solution with pH to about 7 and heated to 70° C., maintained for 30 min. The resulted slurry was centrifuged and re-dispersed into 1.5 L of water, centrifuged again, repeated the above procedure until nearly no ionic impurities.

The filter cake was re-dispersed into 1 L of ethanol and transferred to a hydrothermal reactor, together with 4 g of citric acid. The slurry was heated to 290° C. and maintained for 8 hours.

When hydrothermal reactor cooling down to room temperature, the blue slurry was collected and centrifuged, then washed and dispersed with water, and centrifuged to obtain a cake.

The cake was re-dispersed into 600 mL of water, with 7.5 g of tetramethyl ammonium hydroxide and 300 mL of methanol solution containing 22.5 g of cetyl trimethyl ammonium bromide and stirred for 10 min. The slurry was centrifuged and sufficiently dispersed into 1.5 L of water, centrifuged again, washed with water and acetone separately to remove excess surfactants and ionic impurities, to obtain the cake, which was re-dispersed into 600 mL of acetone. The suspension was evaporated to dryness under reduced pressure to remove acetone.

A certain quantity of toluene and 3 g octylamine were added to finally form a dark blue toluene dispersion of ITO nano-particles with the solid content (based on the weight of the dispersion) at 40%.

The properties of the prepared ITO nano-particles and their dispersion were similar to example 6.

Example 8

This embodiment is application example.

In this example, the manufacturing method of ATO nano-particles in a water-based dispersion is the same to in Example 4, except that the hydrothermal temperature is 260° C., treatment time for 15 hours while the amount of antimony (antimony relative to the ATO mole percent) of 5%, 7.5%, 10%, 12.5%. Prepared ATO nanoparticles was tested by TEM, XRD, dynamic light scattering particle diameter analyzer showing that the results are similar to example 4.

Figure 9:
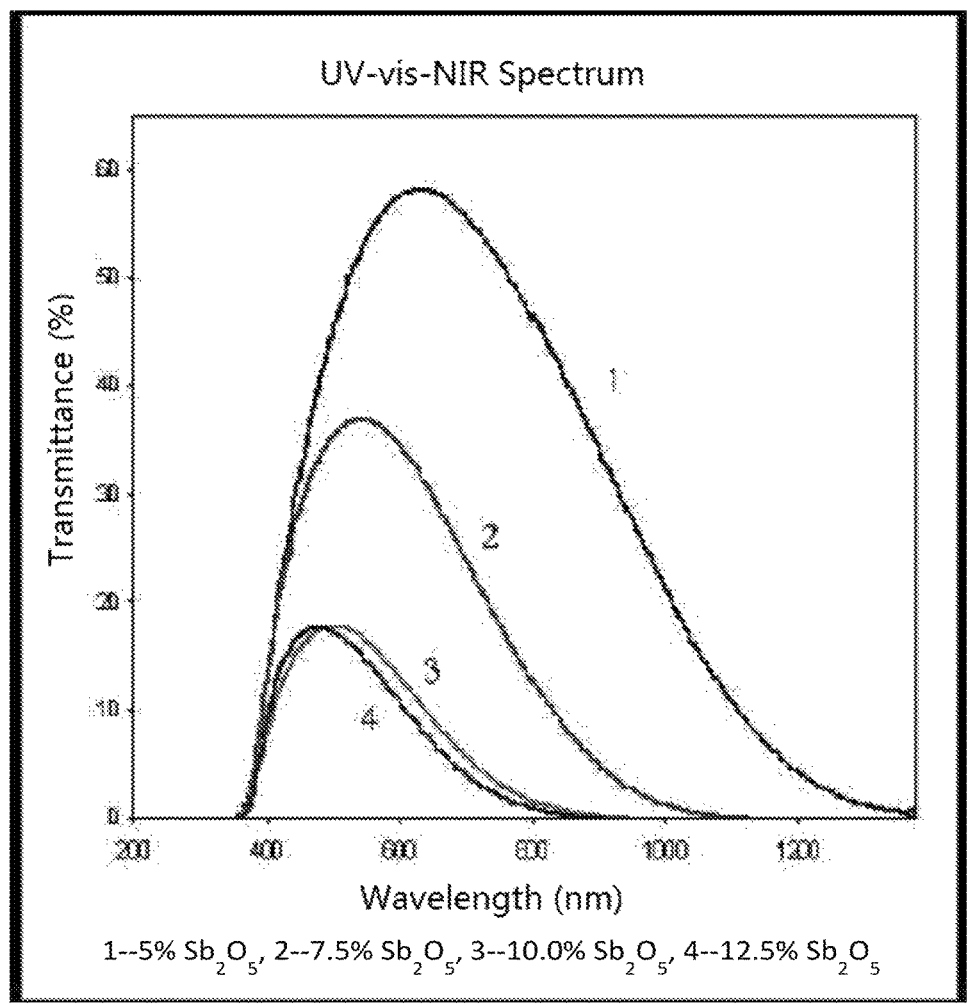
FIG. 9 shows the UV-Vis-NIR spectrum of ATO nanoparticles with different antimony doping levels dispersed in water with 5% of solid content prepared in example 7 below.

The obtained aqueous dispersion of ATO nano-particles in various antimony concentrations with 40% of solids content were diluted to 5% aqueous solution. UV-visible-IR spectroscopy showed the change in the properties of IR blocking (seen in FIG. 9), indicating that adjusting the concentration of antimony in ATO nano-particles can cause changes in IR blocking performance in the application system. Usually, the higher the antimony, the better the IR blocking. when the content of antimony is more than 12%, the IR blocking performance did not change much. This variation shows that controlling the content of antimony in ATO nano-particles can regulate the performance of IR blocking.

Example 9

This embodiment is application example.

In this example, the manufacturing method of ATO nano-particles in a water-based dispersion is the same to in Example 4, except that the hydrothermal temperature is 260° C., time for 15 hours. Prepared ATO nanoparticles was tested by TEM, XRD, dynamic light scattering particle diameter analyzer showing that the results are similar to example 4.

Figure 10:
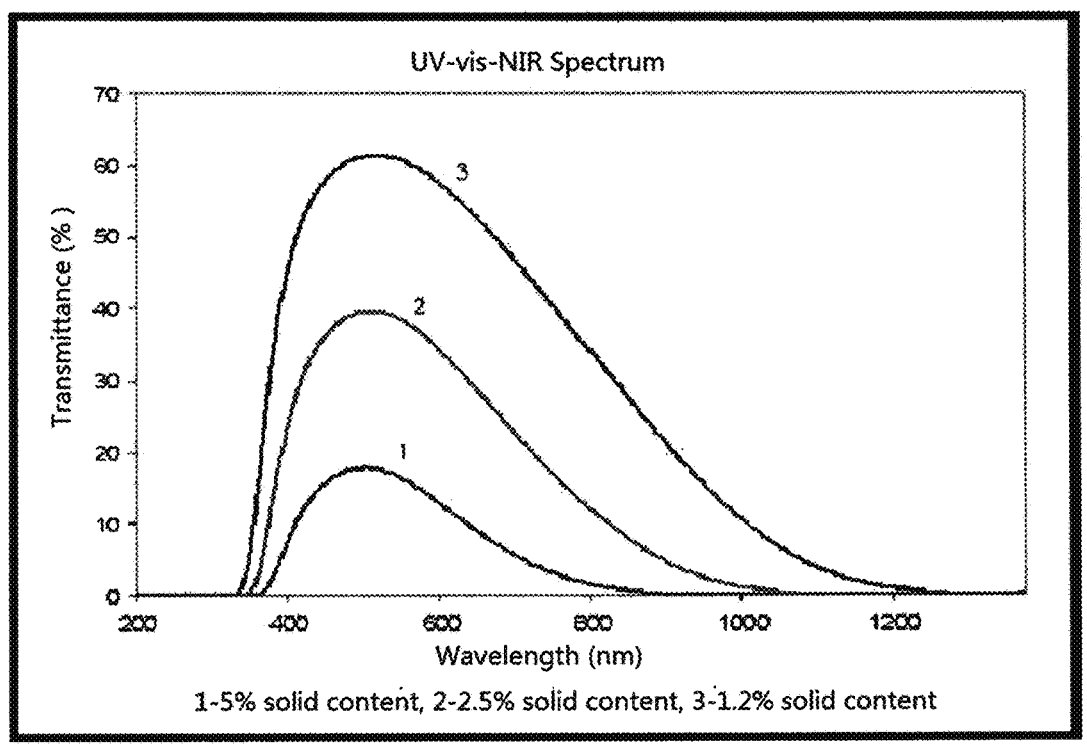
FIG. 10 shows the UV-Vis-NIR spectrum of ATO nanoparticles dispersed in water with different solid content prepared in example 8 below.

The obtained aqueous dispersion with 40% of solids content of ATO nano-particles were diluted to 5%, 2.5%, 1.25% of solids content of the aqueous solution, and found the change of IR blocking performance by testing UV-visible-IR spectroscopy (see FIG. 10). The higher the solids of the ATO nano-particles, the better the IR blocking. This variation shows that controlling the solids content of ATO nano-particles in the application system can regulate the performance of IR blocking.

Example 10

This embodiment is application example.

In this example, the manufacturing method of ATO nano-particles in a water-based dispersion is the same to in Example 4, except that the hydrothermal temperature is 260° C., time for 15 hours. Prepared ATO nanoparticles was tested by TEM, XRD, dynamic light scattering particle diameter analyzer showing that the results are similar to example 4.

Figure 11:
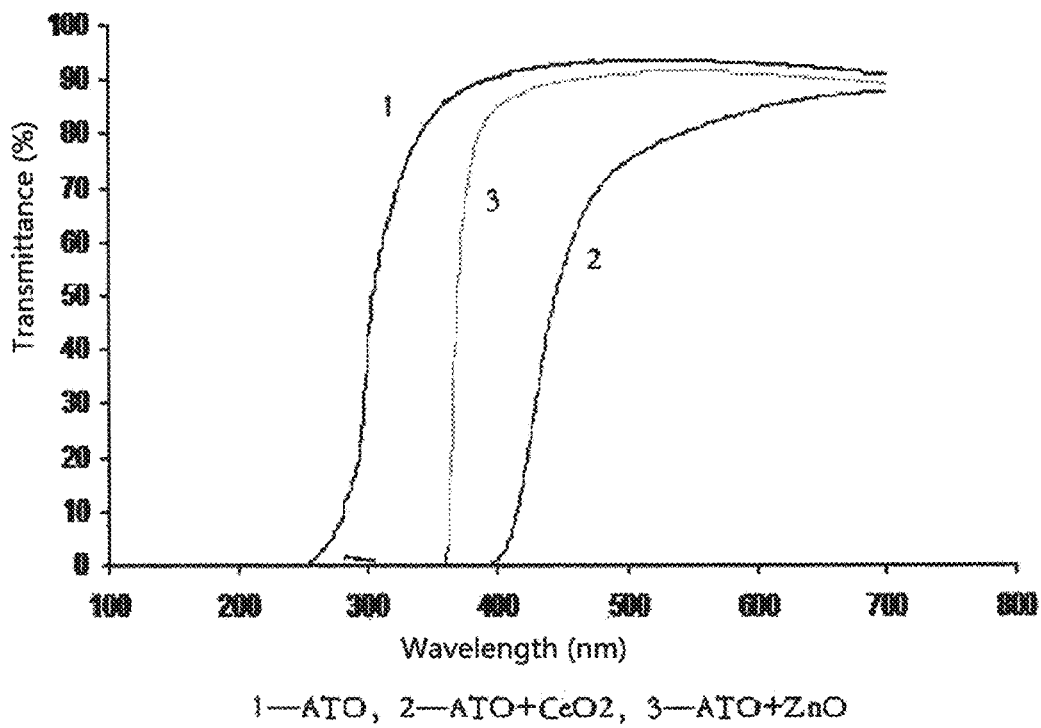
FIG. 11 shows the UV spectrum of ATO nanoparticles and ATO+CeO$_2$ or ATO+ZnO metal oxide nanoparticles composite dispersed in water with 5% of solid content prepared in example 9 below.

The obtained aqueous dispersion with 40% of solids content of ATO nano-particles were diluted to 5% of solids content of the aqueous solution, and prepared the composite metal oxide dispersions by mixing with ZnO or $CeO_2$ aqueous dispersion in same solid content in preparation of PCT/SG2008/000442, separately. UV-visible-IR spectroscopy testing found the dispersion had IR blocking property similar to example 8, moreover, the addition of ZnO or CeO2 showed significant UV blocking. The UV transmittance testing results was shown in FIG. 11. This variation shows that altering amount of UV blocking additives, such as ZnO or $CeO_2$ to control the performance of UV blocking.

Example 11

The aqueous dispersion of nano ATO prepared as described in example 4 in the present invention, alone or combination with nano zinc oxide aqueous dispersion prepared in PCT/SG2008/000442, was/were added to the aqueous acrylic acid coatings. In this coating formulation, the acrylic resin comprised 20 wt % of the total amount of the coating, which also contained a small amount of levelling agents and other additives. ATO nanoparticles accounted for 10 wt % of the total amount, ZnO nanoparticles 5 wt % of that.

Figure 12A:
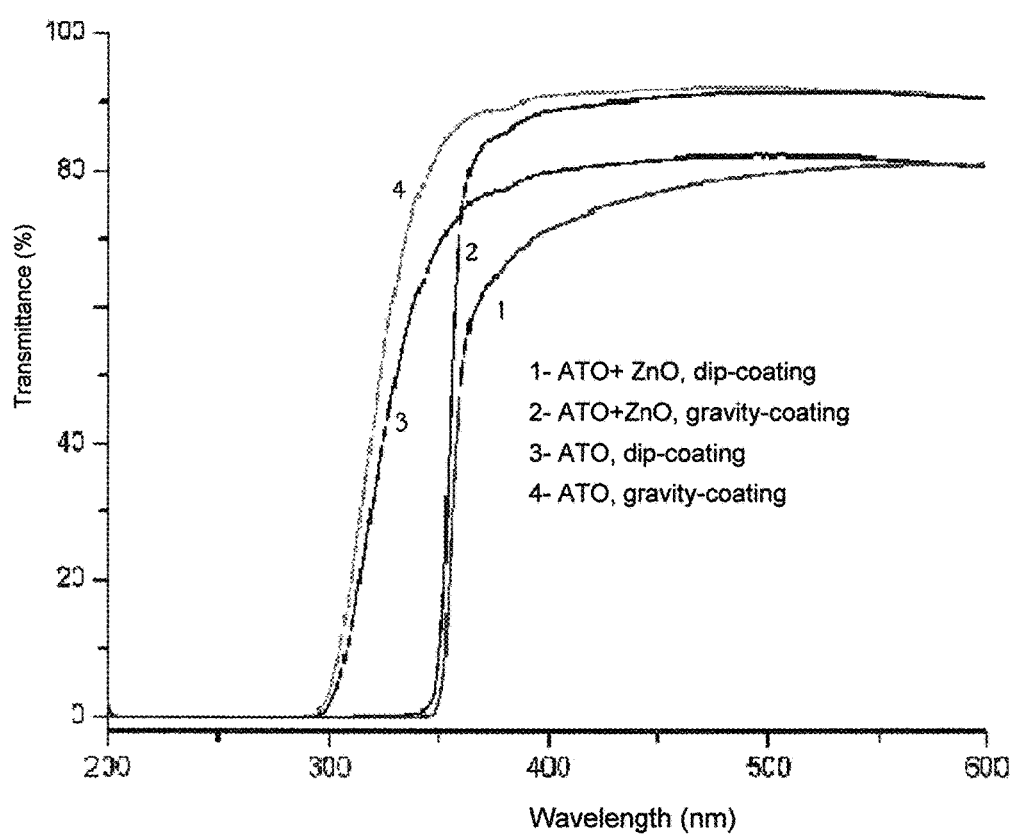
FIGS. 12A and 12B show the UV-Vis-NIR spectrum of glass coated by aqueous acrylic acid paint containing ATO nanoparticles or ATO+ZnO nanoparticles using dip-coating method or gravity-coating method in example 10 below.
Figure 12B:
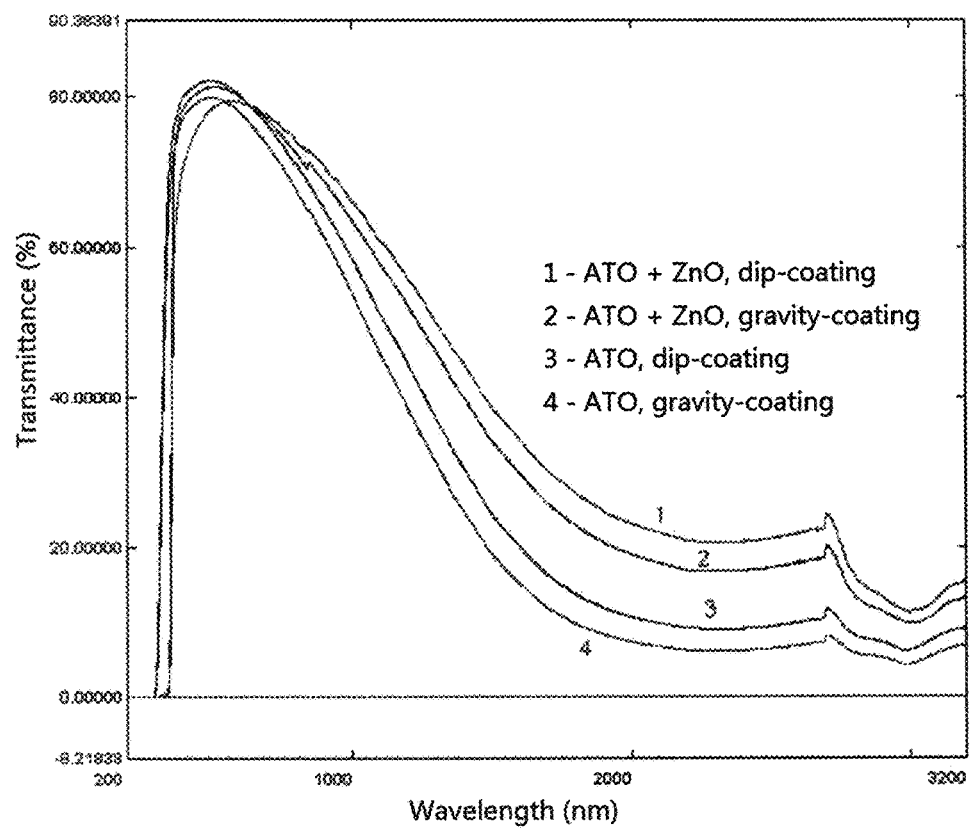

The coating was coated on the glass through the dip-coating or the gravity-coating method, respectively. Controlling the thickness of the coating on the glass was about 40 microns. In accordance with China National Standard GB/T 2680-94 (or international standard E 903-96), the glass coated with this coating was analyzed by UV-visible-IR spectroscopy, as shown in FIGS. 12A and 12B. FIG. 12A showed that ATO nano-particles in the coating showed good IR blocking property, and ZnO nano-particles for UV blocking function separately, without affecting the visible light transmittance. The specific solar control properties were shown in the following table.

TABLE 1

| Different types of glass coating | UV blocking (350 nm) (%) | Visible light transmittance (550 nm) (%) | IR blocking (%) |
| --- | --- | --- | --- |
| ATO + ZnO, dip-coating | 90% | 80% | 63% |
| ATO + ZnO, gravity coating | 95% | 85% | 65% |
| ATO, dip-coating | / | 83% | 73% |
| ATO, gravity coating | / | 90% | 70% |

Comparative Example 2

To disperse commercially available ATO nano-powder with the initial average particle diameter of 8-10 nm similar to the present invention and the same amount of the same surfactant mentioned in example 4 by conventional ball milling methods for 8 hours, ATO dispersion was obtained with 123 nm of the average secondary particle diameter analysed immediately by dynamic light scattering particle diameter analyser. The resulted dispersion of the particles had index of dispersion degree of 12.2 and the steepness ratio of 4.1. (poor stability of the dispersion as settling at the bottom of the container 2 days later. The dispersion was analysed by a dynamic light scattering particle diameter analyzer again, showing that the average secondary particle diameter increased to 253 nm and particle diameter distribution is further widened.)

The dispersion of nano-ATO by the ball milling for 8 hours was rapidly adopted to water-based acrylic paint in the same methods and amount as in example 10, which was applied on the glass by gravity coating method, with coatings thickness to 40 microns. In accordance with China National Standard GB/T 2680-94 (or international standard E 903-96), the glass coated with the coating was tested UV-visible-IR spectroscopy showing its specific solar control performance in the following table.

TABLE 2

| Different types of glass coating | UV blocking (350 nm) (%) | Visible light transmittance (550 nm) (%) | IR blocking (%) |
| --- | --- | --- | --- |
| ATO on commercial Market | / | 55% | 73% |
| ATO prepared in Example 4 | / | 90% | 75% |

Judging from the appearance, the glass coated with commercial ATO dispersion by ball milling looked blue and pale without translucent character; while the glass coated with nano ATO produced in Example 4 of the present invention had the light blue transparent feature. The Comparative Example 2 shows that dispersability of ATO nano-particles have an impact on the transparency of coated glass. Only monodispersed particles in the present invention can achieve high transparency and IR blocking performance of the glass at the same time.

Applications

It will be appreciated that the disclosed process can enable direct synthesis of tin-containing metal oxide nanoparticles or tin-containing metal oxide nanoparticles in monodispersed state and for further preparation of dispersion of metal oxide nanocomposites for UV and IR blocking. The dispersion of tin-containing metal oxide nanoparticles or dispersion of metal oxide nanocomposites for UV and IR blocking may have a high concentration as defined by its high solid loading.

Advantageously, all the reactants used in the disclosed process are commercially available and economically priced. More advantageously, the process does not require the use of high temperature calcination. This lowers the cost of the production and reduces the deterioration of the equipment used in the process. There is no addition need for the use of expensive reactants for the large scale production of the tin-containing metal oxide nanoparticles, their dispersion and dispersion of metal oxide nanocomposites for UV and IR blocking.

Advantageously, the monodispersion produced from the disclosed process may be more stable as compared to known particles from other methods, also with advantages that the particles do not agglomerate, and the dispersion do not have ionic impurities. The disclosed monodispersion can be kept for a period of more than one month without any appreciable loss in stability properties. The nano-sized tin-containing metal oxide particles can be re-dispersed in a solvent to substantially reform into a monodispersion, without any appreciable loss in physical stability.

Advantageously, the disclosed process enables a highly concentrated dispersion of nano-sized tin-containing metal oxide, or dispersion of metal oxide nanocomposites for UV and IR blocking. This may significantly reduce the amount of storage space and the cost of transportation as compared to known products of tin-containing metal oxide nanoparticles and their dispersion.

Advantageously, the liquid-liquid phase transfer step may provide a simple and effective solution to remove the by-products that may be ionic in nature that cause destabilization of the monodispersion.

It will be appreciated that the capacity of the process can be scaled up to form larger quantities of tin-containing metal oxide nanoparticles, their dispersion, and dispersion of metal oxide nanocomposites for UV and IR blocking, without affecting the stability and particle size distribution of the product.

Advantageously, the tin-containing metal oxide nanoparticles may be re-dispersed in a suitable dispersing medium that may be dependent on the needs of the user for the end-product. Accordingly, a polar solvent or a non-polar solvent may be used as the dispersing medium. The dispersion of tin-containing metal oxide nanoparticles or dispersion of metal oxide nanocomposites for UV and IR blocking may be suitable for use in an organic matrix material, such as a polymeric material, according to the requirements of the end-product, for application of glass paint or shielding film. As using the tin-containing metal oxide nanoparticles prepared with disclosed process, the secondary particle size may be controlled in nano-scale, to result in highly transparent glass coating or shielding film for both UV and IR blocking without affect the visible light transmittance, and hence to achieve good transparent effect and thermal insulation effect for glass.

It will be apparent the various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method for preparing a dispersion of tin-containing metal oxide nano-particles, wherein the tin-containing metal oxide comprises tin element and an aid metallic element other than tin selected from antimony, indium, titanium, copper, zinc, zirconium, cerium, yttrium, lanthanum, niobium or a mixture thereof; and the tin-containing metal oxide nano-particles have an initial average particle diameter of 2-50 nm, a particle diameter distribution as defined with an Index of dispersion degree of less than 7 and a steepness ratio of less than 3, the method comprises steps of:
   (1) reacting a solution containing tin ions and a solution containing ions of the aid metallic element other tin with a solution of precipitating agent at a temperature of less than 100° C. under a non-acidic condition in an aqueous medium comprising at least one of alcohols, amides, ketones, epoxides and mixtures thereof to form tin-containing metal oxide precursor particles and a first by-product in ionic form; wherein the precipitating agent is selected from alkali metal hydroxides, alkaline earth metal hydroxides, alkali metal carbonates, alkaline earth metal carbonates, alkali metal bicarbonates, ammonia, organic bases and mixtures thereof;
   (2) separating the tin-containing metal oxide precursor particles from the first by-product in ionic form to obtain tin-containing metal oxide precursor particles substantially free of ionic impurities;
   (3) reacting the tin-containing metal oxide precursor particles substantially free of Ionic impurities with an oxidizing agent or a reducing agent at a temperature of 150-400° C. and a pressure of 5 to 10 atmospheres to obtain tin-containing metal oxide particles and a second by-product in ionic form;
   (4) coating the tin-containing metal oxide particles with a surfactant in an amount of 0.01% to 30% relative to the weight of tin-containing metal oxide particle to obtain coated tin-containing metal oxide particles, wherein the surfactant is selected from a non-silane surface modifying agent, a silane coupling agent, a titanate coupling agent, or a mixture thereof, and the non-silane surface modifying agent is selected from cationic surfactants, non-ionic surfactants, polymeric surfactants and mixtures thereof;
   (5) separating the coated tin-containing metal oxide particles from the second by-product in ionic form to obtain tin-containing metal oxide nano-particles substantially free of ionic impurities;
   (6) adding a dispersion medium and a dispersing agent to the tin-containing metal oxide nano-particles substantially free of Ionic impurities to obtain the dispersion of tin-containing metal oxide nano-particles,
   wherein, when the dispersion medium is water in step (6), the dispersing agent is one or more selected from ethanolamine, triethanolamine, triethylamine, diisopropanol amine, tetramethylammonium hydroxide, polyvinyl alcohol, methacryloxy silane, polyacrylic acid ammonium salt dispersing agent, polyacrylic acid sodium salt dispersing agent, polysiloxane dispersing agent, polyamide dispersing agent, polymer block copolymer dispersing agent; and when the disperse medium is an organic solvent the dispersing agent is one or more selected from octylamine, polycarboxylic salt dispersing agents, polycarboxylic-sulfonic copolymer dispersing agents, polymaleicanhydride copolymer dispersing agents, silane coupling agents, titanate coupling agents.

2. The method according to claim 1, wherein the separating of step (2) or (4) is carried out by any one of methods of liquid-liquid phase transfer, liquid-liquid phase transfer after washing, centrifugation after washing, filtration after washing.

3. The method according to claim 1, wherein the reacting of step (1) is carried out at a temperature range of 40-80° C., under substantially alkaline condition, the aqueous medium comprising one or more alcohols mixed with water, wherein the alcohols have a volume of 1% to 99% relative to water.

4. The method according to claim 1, wherein the tin ions and/or ions of other metal in step (1) are derived from their acetate, halide, nitrate, phosphate, sulfate, perchlorate, borate, iodate, carbonate, perchlorate, tartrate, formate, gluconate, lactate, sulfamate, hydrates or mixtures of these salts.

5. The method according to claim 1, wherein said oxidizing agent in step (3) is a peroxide selected from $Na_2O_2$, $K_2O_2$, $H_2O_2$ and peroxyacetic acid, and the reducing agent in step (3) is selected from hydrazine hydrate, ethylenediamine, oxalic acid, formaldehyde, acetaldehyde, metallic tin powder, sodium borohydride and a mixture thereof.

6. The method according to claim 1, wherein said step (1) and/or step (3) is carried out under high shear condition.

7. The method according to claim 1, wherein, in step (8), the dispersing agent has an amount in range of 5% to 20% based on the weight of tin-containing metal oxide nano-particles.

8. The method according to claim 1, wherein the tin-containing metal oxide nano-particles have a crystal structure selected from tetragonal cassiterite, bixbyite, tetragonal cassiterite-like and bixbyite-like structure.

9. The method according to claim 1, wherein the tin-containing metal oxide is an antimony-tin oxide or an indium-tin oxide.

10. The method according to claim 1, wherein the dispersion has a solid content of the tin-containing metal oxide nanoparticles of at least 5%.

11. The method according to claim 1, further comprising the following step:
   (7) adding a dispersion of nano-sized zinc oxide, titanium oxide or cerium oxide to the dispersion of tin-containing metal oxide nano-particles.

* * * * *